United States Patent [19]
Yoshino

[11] Patent Number: 5,974,229
[45] Date of Patent: Oct. 26, 1999

[54] DEVELOPING AGENT REPLENISHING METHOD AND DIGITAL PHOTOGRAPHIC PRINTER

[75] Inventor: Tatsuo Yoshino, Kanagawa, Japan

[73] Assignee: Fuji Photo Film Co., Ltd., Kanagawa, Japan

[21] Appl. No.: 08/892,204

[22] Filed: Jul. 14, 1997

[30]     Foreign Application Priority Data

| Jul. 15, 1996 | [JP] | Japan | 8-184978 |
| Jul. 15, 1996 | [JP] | Japan | 8-184979 |
| Aug. 29, 1996 | [JP] | Japan | 8-228913 |

[51] Int. Cl.$^6$ .......................... B41B 15/00; G03G 15/08; G03G 15/10; B41J 29/38
[52] U.S. Cl. .......................... 395/109; 395/109; 399/53; 399/58; 399/61; 399/62; 347/6; 347/7
[58] Field of Search .................... 395/109; 399/53, 399/58, 61, 62, 38, 340, 49, 302; 347/6, 7; 396/67, 620, 625, 626; 408/208, 196.1, 202.4; 430/376, 421, 363

[56]         References Cited

U.S. PATENT DOCUMENTS

| 5,752,122 | 5/1998 | Ishikawa | 369/612 |
| 5,754,916 | 5/1998 | Kitayama et al. | 399/27 |

FOREIGN PATENT DOCUMENTS

| 2-146038 | 6/1990 | Japan | G03C 5/31 |
| 6-310598 | 11/1994 | Japan | H01L 21/78 |
| 6-310599 | 11/1994 | Japan | H01L 21/82 |

*Primary Examiner*—Edward L. Coles
*Assistant Examiner*—Twyler Lamb
*Attorney, Agent, or Firm*—Sughrue, Mion, Zinn, Macpeak & Seas, PLLC

[57]         ABSTRACT

There is provided a developing agent replenishing method in a digital photographic printer in which an image is exposed onto a photosensitive material based on digital data containing image data and the exposed photosensitive material is developed by a developing agent, comprising the steps of: (a) calculating an image rate of an image to be exposed based on the digital data, the image rate being a parameter for obtaining, based on at least one of a density characteristic of the image to be exposed, depth of the image to be exposed, and contrast of the image to be exposed, a replenishment quantity of a developing agent used for development processing of the image to be exposed; (b) calculating a replenishment quantity of the developing agent based on the calculated image rate; and (c) effecting replenishment of the developing agent on the basis of the calculated replenishment quantity. The replenishment quantity of the developing agent is calculated based on the image rate as described above, and therefore, an appropriate quantity of developing agent can be supplied.

20 Claims, 21 Drawing Sheets

F I G. 6

BACKGROUND   PRINT SIZE: B = 1

BACKGROUND DENSITY: $D_B = 0$

PHOTOGRAPHIC IMAGE

IMAGE SIZE: F = 0.69

IMAGE DENSITY: $D_F = 0.95$

F I G. 9
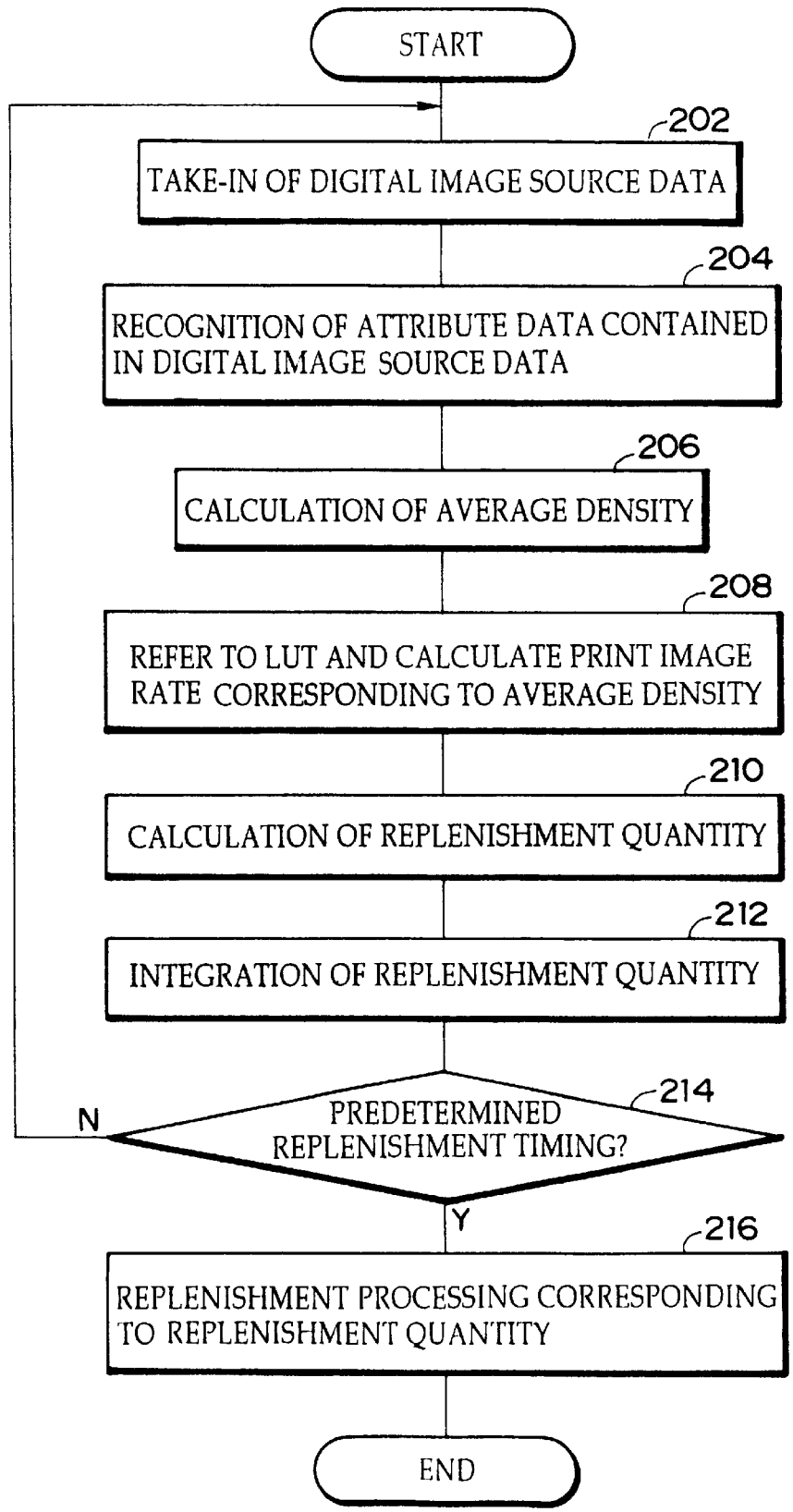

F I G. 1 0

| Test No. | Image | Number of Sheets | Replenishment Quantity |
|---|---|---|---|
| 1 (Comparative Example) | A | 900 | 15.6 ml/sixmo size |
| 2 (Comparative Example) | B | 900 | |
| 3 (Comparative Example) | C | 900 | |
| 4 (EMBODIMENT) | A | 900 | 7.5 ml/sixmo size |
| 5 (EMBODIMENT) | B | 900 | 15.6 ml/sixmo size |
| 6 (EMBODIMENT) | C | 900 | 29.2 ml/sixmo size |

F I G. 11

| | Gray Density | | |
|---|---|---|---|
| | B | G | R |
| Before Test 1 | 0.85 | 0.86 | 0.83 |
| After Test 1 | 0.97 (+0.12) | 0.92 (+0.06) | 0.90 (+0.07) |
| Before Test 2 | 0.87 | 0.86 | 0.84 |
| After Test 2 | 0.86 (-0.01) | 0.86 (+0.00) | 0.85 (+0.01) |
| Before Test 3 | 0.86 | 0.87 | 0.82 |
| After Test 3 | 0.60 (-0.26) | 0.73 (-0.14) | 0.72 (-0.10) |
| Before Test 4 | 0.81 | 0.82 | 0.82 |
| After Test 4 | 0.79 (-0.02) | 0.79 (-0.03) | 0.80 (-0.02) |
| Before Test 5 | 0.82 | 0.83 | 0.80 |
| After Test 5 | 0.82 (+0.00) | 0.82 (-0.01) | 0.81 (+0.01) |
| Before Test 6 | 0.83 | 0.83 | 0.80 |
| After Test 6 | 0.86 (+0.03) | 0.85 (+0.02) | 0.83 (+0.03) |

FIG. 19

```
SEPARATE REPLENISHMENT QUANTITY
CALCULATION PROCESSING WITH REGARD TO
EXPOSURE IN DIGITAL EXPOSURE SECTION
            │
            ▼
┌─────────────────────────────────────┐ 642
│  TAKE-IN OF DIGITAL IMAGE SOURCE DATA │
└─────────────────────────────────────┘
            │
            ▼
┌─────────────────────────────────────┐ 644
│  PREPARATION OF OUTPUT IMAGE DATA   │
└─────────────────────────────────────┘
            │
            ▼
┌─────────────────────────────────────┐ 646
│     CALCULATION OF IMAGE RATE       │
│     BASED ON OUTPUT IMAGE DATA      │
└─────────────────────────────────────┘
            │
            ▼
┌─────────────────────────────────────┐ 648
│   CALCULATION OF INDEPENDENT        │
│   REPLENISHMENT QUANTITY            │
│   BASED ON IMAGE RATE               │
└─────────────────────────────────────┘
            │
            ▼
         RETURN
```

FIG. 21

```
┌─────────────────────────────────────┐
│ SEPARATE REPLENISHMENT QUANTITY     │
│ CALCULATION PROCESSING WITH REGARD TO│
│ EXPOSURE IN FILM EXPOSURE SECTION   │
└─────────────────────────────────────┘
                  │
                  ▼  ─684
┌─────────────────────────────────────┐
│ CALCULATION OF PROCESSING AREA      │
└─────────────────────────────────────┘
                  │
                  ▼  ─686
┌─────────────────────────────────────┐
│ CALCULATION OF SEPARATE             │
│ REPLENISHMENT QUANTITY              │
│ CORRESPONDING TO PROCESSING AREA    │
└─────────────────────────────────────┘
                  │
                  ▼
             ( RETURN )
```

DEVELOPING AGENT REPLENISHING METHOD AND DIGITAL PHOTOGRAPHIC PRINTER

BACKGROUND OF THE INVENTION

1. Field of the Invention

The present invention relates to a method for replenishing processing chemicals, for example, a developing agent, and also relates to a photographic printer such as a digital photographic printer. More particularly, the present invention relates to a method for replenishing a developing agent in a digital photographic printer in which an image is exposed onto a photosensitive material on the basis of digital data including image data and the exposed photosensitive material is developed by a developing agent, and also relates to the digital photographic printer.

2. Description of the Related Art

The term "image rate" used in the specification of the present invention means a parameter which is used to obtain, based on a density characteristic value of an image, image density, image contrast, and the like, a quantity of a developing agent replenished, the developing agent being used for development processing of the image. Further, the term "print image rate" used in the specification of the present invention means a parameter which is used to obtain a quantity of the developing agent replenished on the basis of a density characteristic value of the image among the image rate.

Conventionally, a method for replenishing a color development processing solution (hereinafter referred to as a "developing agent") in a development processing section of a projective photographic printer in which a general silver halide photosensitive material is used (for example, a printer in which exposure is effected in such a manner that light from a light source is irradiated on a negative film and the transmitted light is projected on a photographic printing paper via a lens) is constructed such that, assuming that an image modulus of an exposed image is set substantially fixed, the amount of consumption (i.e., a quantity of the developing agent to be replenished, hereinafter referred to as "replenishment quantity") is calculated by multiplying a processing quantity (i.e., a processing area) by a fixed coefficient, and on the basis of the calculated quantity, a replenishing agent of the replenishment quantity is supplied. Namely, an image exposed by the projective photographic printer is one in which objects in the natural world are photographed, and it can be supposed that a density characteristic value of the image, image density, image contrast, and the like will be generally stabilized. Accordingly, it can be further supposed that the image rate of such an image will become substantially constant. As a result, the above-described replenishment quantity calculation method can be applied to the projective photographic printer.

Further, in recent photographic printers, various images are to be processed, such as an image with an original image to be printed being recorded on a negative film or on a slide, an image recorded on a photographic print, and digital image data stored on a storing medium such as a floppy disk. Accordingly, the present inventors have proposed a printing system (corresponding to the above-described photographic printer) in which an exposure section is provided correspondingly for each type of original image and a photosensitive material on which an image is exposed in any one of the exposure sections is subjected to development processing in a common development processing section (see Japanese Patent Application Nos. 6-310598 and 6-310599).

It can be supposed that, among original images processed by the above-described photographic printer, an image recorded on a negative film or on a slide has a substantially fixed image rate, the above-described replenishment quantity calculation method can be applied.

On the other hand, in recent years, there has been widely used a digital photographic printer which has a function of exposing, onto a photographic printing paper, an image generated by computer processing, for example, computer graphics (hereinafter referred to as CG), a composite image (for example, an image formed with a plurality of images being synthesized on a mount paper such as an album print, or an image with characters and a photograph being synthesized), and the like. The above-described CG images, composite images, or the like, exposed by the digital photographic printer, have different densities (for example, there are various images which are extremely dark, extremely light, and the like) unlike images, with objects in the natural world being photographed, exposed by the above-described projective photographic printer. Therefore, it cannot be supposed that the image rate of the above-described CG image or composite image becomes substantially constant.

Accordingly, in a case in which the above-described replenishment quantity calculation method is applied to the digital photographic printer, an appropriate replenishment quantity cannot be calculated due to each image rate in the images printed by the digital photographic printer being not made constant. When a developing agent of an inappropriate replenishment quantity is supplied, over-replenishment or under-replenishment occurs so that a fixed development processing condition cannot be maintained. As a result, there is a possibility that a finished state of a photographic print may be adversely affected by the above circumstances.

In other words, there has not been established, under existing circumstances, a developing agent replenishing method in which, in a photographic printer for effecting exposure and development processing for various original images, an appropriate replenishment quantity of the developing agent is calculated for each of the various original images, and on the calculated replenishment quantity, proper replenishment of the developing agent is effected.

Further, there has been recently a growing need for apparatus downsizing and a downsized development processing tank or reduced replenishment quantity of the developing agent is required. At the same time, precise control of the replenishment quantity of the developing agent is also required.

In order to solve the above-described drawbacks, there has been proposed a technique in which, by effecting prescan photometric processing using a sensor for a character document or an original document with a plurality of prints installed on a mounting paper and by supposing an image rate of an image to be printed on a photographic printing paper based on the photometric value and a density correction key, an optimum replenishment quantity is calculated by multiplying a parameter varying in accordance with the image rate by a processing quantity, and based on the calculated quantity, the developing agent of the optimum replenishment quantity is supplied (see Japanese Patent Application Laid-Open (JP-A) No. 2-146038).

In the digital photographic printer, both an original such as a negative film is printed by photometric processing (scanning) using a sensor, and digital image data generated by computer processing (for example, CG image), digital image data previously read by another scanner so as to be stored in a storing medium, and the like may be printed.

However, the prescan photometric processing using the sensor is not intended for the above-described digital image data, and therefore, the above-described developing agent replenishing method disclosed in JP-A No. 2-146038 cannot be applied to the digital photographic printer. In addition, these digital image data particularly have different densities (for example, various image data extremely dark, extremely light, and the like) and it was difficult to assume that the image rate becomes constant. Namely, in the development processing for the above-described digital image data generated by computer processing, digital image data stored in a storing medium, and the like, it was difficult to calculate an appropriate replenishment quantity of the developing agent.

SUMMARY OF THE INVENTION

The present invention has been devised to solve the above-described drawbacks and an object of the present invention is to provide a developing agent replenishing method in which an optimum replenishment quantity of a developing agent in accordance with an image rate of each of digital image data exposed by a digital photographic printer is calculated and precise replenishment of the developing agent based on the calculated replenishment quantity can be effected, and also provide a digital photographic printer which can execute the developing agent replenishing method.

Further, another object of the present invention is to provide a processing chemicals replenishing method in which, in a photographic printer where various original images are exposed and developed by a common development processing section, an appropriate replenishment quantity of a developing agent is calculated for each of the various original images and proper replenishment of the developing agent based on the calculated replenishment quantity can be effected, and also provide the photographic printer.

In order to achieve the above-described objects of the present invention, in accordance with a first aspect of the present invention, there is provided a developing agent replenishing method in a digital photographic printer in which an image is exposed onto a photosensitive material based on digital data containing image data and the exposed photosensitive material is developed by a developing agent, comprising the steps of: (a) calculating an image rate of an image to be exposed based on the digital data, the image rate being a parameter for obtaining, based on at least one of density characteristic of the image to be exposed, depth of the image to be exposed, and contrast of the image to be exposed, a replenishment quantity of a developing agent used for development processing of the image to be exposed; (b) calculating a replenishment quantity of the developing agent based on the calculated image rate; and (c) effecting replenishment of the developing agent based on the calculated replenishment quantity.

A second aspect of the present invention is constructed such that, in the above-described first aspect, the digital data is digital image source data containing attribute data of the image data, and in said step (a), the image rate is calculated on the basis of the attribute data.

In accordance with the first aspect of the present invention, the image rate is calculated by the step (a) based on the digital data containing image data, and based on the calculated image rate, the replenishment quantity of the developing agent is calculated the step (b). The image rate is a parameter for obtaining, based on at least one of a plurality of density characteristics of the image to be exposed, the depth of the image to be exposed, and the contrast of the image to be exposed, the replenishment quantity of the developing agent used for development processing of the image to be exposed. By using the parameter, a more appropriate quantity of developing agent can be supplied, compared to the conventional method.

In the developing agent replenishing method according to the second aspect of the present invention, first, based on attribute data contained in digital image source data, the image rate of the image to be exposed is calculated, for example, as described below.

Several examples in which the image rate is calculated based on the attribute data will be hereinafter given. Meanwhile, there will be shown, as an example, a case in which a print image rate, among the image rate, is calculated as the parameter for obtaining the replenishment quantity of the developing agent based on the density characteristic value of the image. Further, it is preferable that an average density value of the image be used as the density characteristic value thereto, and in the descriptions of the following examples, a three-color average density value of the image will be used.

A first example of the above-described calculation is first described in a case in which a TIFF-PCD format image data represented by graphic image data or photographic image data is expanded to form output digital image data and an image based on output digital image data is exposed onto the photosensitive material. In this case, by analyzing an extension of an image file format or attribute data when digital image source data is expanded to the output digital image data, recognition of the print size, the image size, the state of a background (color, pattern, or the like), and the type of image data format (the image data format is a graphic image or a photographic image) is made.

Here, when, for example, photographic image data in which the image data of the image to be exposed is attached to background image data is provided, average density $D_A$ can be calculated by using the following expression (1) and a density value previously set for each kind of image data.

$$D_A = ((B-F)D_B + FD_F)/B \quad (1)$$

Meanwhile, symbols in the above-described expression (1) are as follows:

$D_B$: background density
$D_F$: image density (density of an image section on a print)
B: print size
F: image size As shown in FIG. 6, when it is assumed that, in the case of image data with a photographic image being attached to a white background, background density $D_B$ and photographic image density $D_F$ are previously set at 0 and 0.95, for example, a photographic image of octavo size is exposed onto a printing paper of sixmo size, the image size F is set at 0.69 with respect to the print size B being set at 1. For this reason, three-color average density DA can be calculated to be 0.66 by the above-described expression (1).

As a second example, there is shown a case in which the three-color average density $D_A$ is calculated from a document file having a graphic function represented by postscript language. This case given herein is structured in such a manner that image data is attached to a predetermined region with document data written in a PS format being provided as a background.

First, assuming that the background of an image is formed by document data, i.e., many characters are used, by recognizing the PS format, and background density $D_B$ is set as a document background density ($D_B$=0.30). Subsequently, the image size and the type of image (in this example, graphic image data) can be obtained, as described in the first example, from the attribute data contained in image data of a predetermined region (i.e., a file format, tag data within a file, or the like). Therefore, in the same way as in the above-described first example, average density $D_A$ is calculated by expression (1). In the second example, when, assuming that the image density $D_F$ of the graphic image data is previously set at 0.75, for example, a photographic image of octavo size is exposed onto a printing paper of sixmo size, the photographic image size F is set at 0.69 with respect to the print size B being set at 1. For this reason, the average density $D_A$ can be calculated to be 0.61 by the above-described expression (1).

A third example is an example of calculation based on digital image source data (i.e., direct digital image source data) directly input from a negative (or positive) reading scanner built in a digital photographic printer. In this case, since the attribute data is not contained in the digital image source data, the direct digital image source data from the scanner can be recognized (however, the attribute data may be added to the direct digital image source data).

In the third example, a direct print for a photosensitive material (i.e., an entire print) can be recognized, and therefore it can be understood that print size B equals image size F (namely, image density $D_F$=average density $D_A$). Since the image data is photographic image data, assuming that the photographic image density $D_F$ is previously set at 0.95, the average density $D_A$ can be calculated at 0.95.

As described above, the average density of the image can be calculated from the attribute data contained in the digital image source data.

Meanwhile, in the above-described examples, as the image density, an image density value is used which is previously set for each type of image data based on the type of image data (for example, photographic image data, graphic image data, character image data, composite image data, and the like). However, so long as the attribute data contains data having high correlation to the image rate (for example, density data), the density data is used to obtain average density $D_A$ more precisely.

After average density $D_A$ has been obtained as described above, by referencing, for example, a look-up table (LUT) shown in FIG. 7 which shows correspondence between density and the print image rate, print image rate D is calculated from average density DA. However, this look-up table may be replaced by a look-up table shown in FIG. 8 in which print image rate D is set at values of several grades so that the image rate is obtained from a schematic determination of density level: dark, slightly dark, medium, slightly light, and light, so that substantially similar effects can be obtained.

According to the developing agent replenishing method of the second aspect of the present invention, as an example, the replenishment quantity of the developing agent is calculated based on the above-described print image rate D. In this case, the replenishment quantity may be calculated by the following expression (2) or may be calculated in such a manner that, based on an image rate table which shows the correspondence between the print image rate previously set at values of several grades and a replenishment quantity per unit processing area, the replenishment quantity per unit processing area corresponding to the above calculated print image rate D is obtained and a replenishment quantity to be supplied is calculated from the replenishment quantity per unit processing area and an actual processing area.

The following expression (2) will be described hereinafter, which is used for calculating the replenishment quantity of the developing agent:

$$P=aS(1+\alpha(GD/x_0-1))\beta \qquad (2)$$

Symbols in the expression (2) are as follows:

P: calculated replenishment quantity (ml)

a: standard replenishment quantity (ml)

S: processing area ratio $\alpha$: control coefficient

G: maximum development ratio of photosensitive material

D: print image rate $x_0$: standard development ratio $\beta$: photosensitive material factor The standard replenishment quantity represented by "a" in the above-described expression (2) means a replenishment quantity of the developing agent per standard area required when a standard photosensitive material exposed to have a previously set standard development ratio is subjected to development processing.

The processing area ratio represented by S means a processing area ratio of the photosensitive material to a standard area at a timing of calculation of the replenishment quantity.

The control coefficient represented by a means a contribution ratio of a portion in which the replenishment quantity is changed by the image rate. In the first embodiment of the present invention, described later, the control coefficient is set at 0.7 (fixed) so that the photosensitive material is set in a slightly undercontrolled state.

The maximum development ratio of the photosensitive material, represented by G, is previously calculated based on the development ratio when solid black image data is exposed. In the first embodiment of the present invention, described later, maximum development ratio (G) is set at 0.7 (fixed).

The print image rate represented by D is calculated based on the attribute data contained in the digital image source data.

The standard development ratio represented by $x_0$ means a development ratio when standard output digital image data is printed. In the first embodiment of the present invention, described later, the standard development ratio is set at 0.25 (fixed).

The photosensitive material factor represented by $\beta$ is a value set in accordance with the type of photosensitive material to be exposed. For example, when a silver-halide photosensitive material having an ordinary white support is used as a standard photosensitive material, $\beta$ is set to 1.0. Further, when a silver-halide photosensitive material having a transparent support for an overhead projector (OHP), $\beta$ is set to 1.5. An ordinary print is effected by reflected light (transmitted two times), while an OHP print is effected by transmitted light (one transmission). For this reason, there occurs a difference in the amount by which the photosensitive material is applied to each support so as to have the same apparent density between the above-described two types of photosensitive materials, thereby resulting in the above-described respective photosensitive factors having different values. As described above, since the parameter is provided to adjust the replenishment quantity for each type of photosensitive material, the replenishment quantity is set to flexibly correspond to each of the photosensitive materials. At this time, it is preferable that the type of photosensitive material to be exposed be automatically detected and an optimum parameter corresponding to the photosensitive material to be exposed is set.

By calculating the print image rate based on a density characteristic value of an image to be exposed as described above and further referencing the LUT, an appropriate replenishment quantity can be calculated. However, calculation of the appropriate replenishment quantity may be effected not only based on the density characteristic value of the image to be exposed, but also based on image depth, contrast, and the like.

In the developing agent replenishing method according to the second aspect, replenishment of the developing agent is effected based on the replenishment quantity calculated by, for example, the above-described expression (2).

Accordingly, a development ratio factor of a photosensitive material, by which the replenishment quantity of the developing agent for the photosensitive material is affected, is replaced by an image rate obtained from the attribute data of digital image source data of an image to be actually printed and an optimum replenishment quantity is thereby supplied. As a result, the optimum processing conditions can be maintained and a finished state after processing can be made uniform.

Further, the image rate is calculated based on the attribute data of the digital image source data required for printing, and therefore, installation of a sensor for obtaining the image rate as shown in the technique described in Japanese Patent Application (JP-A) No. 2-146038 is not required, which is advantageous in cost. Further, the image rate of image data which cannot be read by a sensor (for example, a CG image) can also be obtained.

Among the digital image source data, the attribute data whose data volume is smaller than that of the image data is used to effect calculation processing for the image rate, replenishment quantity, and the like. For this reason, compared to a case in which calculation of the image rate, replenishment quantity, and the like is effected by using the above-described image data, simple and high-speed processing can be achieved.

Further, so long as the parameters for calculation of the replenishment quantity are optimized, it is unnecessary for an operator to visually recognize a finished state of the photosensitive material for each fixed period and to manually provide an appropriate quantity of a replenisher based on experience, unlike the conventional method.

Moreover, since precise replenishment is realized by the above-described aspects of the present invention, the quantity of a development processing solution can be reduced, and therefore, the processing tank can be made smaller and the replenishment quantity of the developing agent can be reduced, which have been desired these days.

As an example of digital photographic printer in which the print image rate is calculated based on the density characteristic value of the image to be exposed as described above and an appropriate replenishment quantity is obtained from the print image rate so as to allow proper replenishment of the developing agent (which is an example of the developing agent replenishing method according to the present invention), the digital photographic printer according to the following third and fourth aspects of the present invention is given.

The third aspect of the present invention is a digital photographic printer in which an image is exposed onto a photosensitive material based on digital data containing image data and the exposed photosensitive material is developed by a developing agent, comprising: density characteristic calculation means which calculates, based on the digital data, a density characteristic value of an image to be exposed; image rate calculation means which calculates, on the basis of the density characteristic value calculated by said density characteristic calculation means, a print image rate corresponding to the density characteristic value as a parameter for obtaining a replenishment quantity of the developing agent based on the density characteristic value of the image; replenishment quantity calculation means which calculates the replenishment quantity of the developing agent based on the print image rate calculated by said image rate calculation means; and replenishing means which effects replenishing processing of the developing agent based on the replenishment quantity calculated by said replenishment quantity calculation means.

The fourth aspect of the present invention is constructed such that, in the above-described third aspect, the digital data is digital image source data containing attribute data of the image data and said density characteristic calculation means is provided to calculate the density characteristic value of the image on the basis of the attribute data.

In the digital photographic printer of the third aspect, first, the density characteristic value of the image to be exposed is calculated by the density characteristic value calculation means based on the digital data, and the print image rate is calculated by the image rate calculation means based on the calculated density characteristic value. For example, by using an average density value of the image as an example of the density characteristic value and also referring to a predetermined look-up table, the print image rate corresponding to the average density value may be calculated.

In addition, the replenishment quantity of the developing agent is calculated by the replenishment quantity calculation means on the basis of the calculated print image rate, and on the basis of the calculated replenishment quantity, replenishment of the developing agent is effected by the replenishing means.

Further, in the fourth aspect of the present invention, the density characteristic value is calculated by the density characteristic value calculation means based on the attribute data contained in the image data.

As described above, in accordance with the digital photographic printer of the third and fourth aspects, an appropriate replenishment quantity is calculated in the same way as in the above-described developing agent replenishing method of the first and second aspects, and proper replenishment of the developing agent can thereby be effected. Accordingly, the digital photographic printer of the third and fourth aspects can achieve the same effects as those of the developing agent replenishing method of the first and second aspects.

A fifth aspect of the present invention is constructed such that, in the above-described first aspect, the digital data is one of digital image source data and output digital image data obtained due to predetermined image processing being effected for the digital image source data and used for exposure of the photosensitive material, and in said step (a), the image rate is calculated on the basis of said one of the digital image source data and the output digital image data.

A sixth aspect of the present invention is constructed such that, in the above-described fifth aspect, in said step (a) data is extracted from said one of the digital image source data and the output digital image data in accordance with a predetermined extraction method, and based on the extracted data, the image rate is calculated.

In accordance with the fifth aspect of the present invention, the predetermined processing is effected for the digital image source data so that the output digital image data is generated. On the basis of the output digital image data, an image is exposed onto the photosensitive material.

In the above-described fifth aspect, the image rate of the image may be calculated from the digital image source data, or may be calculated from the digital image source data before predetermined image processing in a process of the predetermined image processing to be effected for the digital image source data. A file format of the digital image source data contains, in addition to data to be converted to the output digital image data, data whose resolution is low for retrieval, and by using the latter data, the image rate of the image may also be calculated. For example, during a process in which predetermined image processing is effected for digital image source data which is formed hierarchically by frequency components of the image from coarse-grained pixels to fine-grained pixels, only image source data of coarse-grained pixels is extracted and the image rate of the image may be calculated therefrom.

There will be described hereinafter a case in which a print image rate, among the image rate, which is used as a parameter for obtaining the replenishment quantity of the developing agent on the basis of the density characteristic value of the image, is calculated based on the output digital image data. Meanwhile, it is preferable that the average density value of the image be used as the density characteristic value of the image, and below, the average density value of the image will be employed.

Meanwhile, calculation of the image rate may be effected in the same way as in the sixth aspect of the present invention, namely, in such a manner that data is extracted from the output digital image data or from the digital image source data based on the predetermined extraction method (extraction rule), and based on the extracted data, the image rate is calculated. As a concrete extraction method, the following methods can be employed:

First, there is shown a method in which all pixels of output digital image data are extracted. This method has the disadvantage that the number of data items to be handled greatly increases, but has the advantage that it is the simplest and most precise method.

Secondly, there is also shown a method of sampling and extracting output digital image data (i.e., a sampling method). For example, when one pixel is extracted from 1,024 pixels, extraction data volume becomes 1/1024. At this time, it is more preferable that pseudo-random number generation of extraction timing occur to prevent dependence on the image.

Thirdly, there is shown a method in which density of the output digital image data is averaged locally per unit multiple pixels and the averaged density is used as one extraction data item. For example, when the density of image data is locally averaged every 1,024 pixels so as to be integrated as one extraction data item, an extraction data volume becomes 1/1024 in the same way as in the above-described sampling method. However, this method is different from the sampling method in that all image data are used as data on which density average is based.

Further, there may also be used a method in which image data is extracted in such a manner that the number of data bits is reduced during extraction such that the resolution of the image data becomes low. For example, when output digital image data is 8-bit data, with only the high-order four bits being extracted, data may be extracted based on a resolution of 16 levels.

For the above-described extraction data, an average density is obtained for each of the three colors of R, G, and B.

For example, the average density for each of the three colors, R, G, and B can be obtained based on the following three expressions (3), (4), and (5). Meanwhile, N means the total number of samples extracted for the calculation of the average density.

$$D_R = \sum_{n=1}^{N} (D_{Rn})/N \quad (3)$$

$$D_G = \sum_{n=1}^{N} (D_{Gn})/N \quad (4)$$

$$D_B = \sum_{n=1}^{N} (D_{Bn})/N \quad (5)$$

The respective average densities of the three colors obtained as described above are averaged so that three-color average density $D_A$ is obtained. Namely, three-color average density $D_A$ is obtained by using the following expression (6):

$$D_A = (D_R + D_G + D_B)/3 \quad (6)$$

Then, by referring to a look-up table (LUT) which shows correspondence between the density and the print image rate, the image rate corresponding to the three-color average density can be obtained. Further, even if the data format of the output digital image data is linear image data, the image rate can be obtained in accordance with the data format. Namely, in the present invention, the data format and extraction method of the output digital image data during calculation of the image rate are not limited to these particular ones.

In order to make the above-described extraction method and the characteristics of the format of the extracted data for calculation of the print image rate fit for the image rate, by using the above-described LUT shown in FIG. 7, print image rate D used for calculation of the replenishment quantity may be calculated from three-color average density $D_A$. Accordingly, the LUT is provided to vary in accordance with the extraction method or the image data format and development processing system, and therefore, the present invention is not limited to the curve shown in FIG. 7. This LUT is replaced by the LUT shown in FIG. 8 in which the print image rate is set at values of several grades so that the image rate schematically approximates from the determination of density level: dark, slightly dark, medium, slightly light, and light, and therefore, a substantially similar effect can be obtained.

Moreover, in accordance with the developing agent replenishing method of the above-described fifth and sixth aspects, based on print image rate D calculated as described above (as an example), the replenishment quantity of the developing agent is calculated. Here, the replenishment quantity may be calculated by the above-described expression (2) or may be calculated in such a manner that, based on an image rate table which shows correspondence between the print image rate D previously set at values of several grades and a replenishment quantity per unit processing area, the replenishment quantity per unit processing area corresponding to the above calculated print image rate is obtained and the replenishment quantity to be provided is calculated from the replenishment quantity per unit processing area and an actual processing area.

By calculating the print image rate based on a density characteristic value of an image to be exposed as described above and further referencing the LUT, an appropriate replenishment quantity can be calculated. However, calculation of the appropriate replenishment quantity may be effected not only based on the density characteristic value of the image to be exposed, but also based on depth, contrast, and the like of the image.

In the developing agent replenishing method according to the fifth and sixth aspects, replenishment of the developing agent is effected based on the replenishment quantity calculated by, for example, the above-described expression (2).

Accordingly, a development ratio factor of a photosensitive material, by which the replenishment quantity of the developing agent for the photosensitive material is affected, is replaced by an image rate obtained from the image data to be actually printed (i.e., output digital image data or the digital image source data) and an optimum replenishment quantity is thereby supplied. As a result, the optimum processing conditions can be maintained and a finished state after processing can be made uniform.

Further, in the fifth and sixth aspects of the present invention in the same way as in the above-described first and second aspects, the image rate is calculated based on image data required for printing. For this reason, installation of a sensor for obtaining the image rate as shown in the technique described in Japanese Patent Application (JP-A) No. 2-146038 is not required, which is advantageous in cost. Further, the image rate for image data which cannot be read by a sensor (for example, a CG image) can also be obtained.

Further, so long as the parameters for calculation of the replenishment quantity are optimized as described above, it is not necessary for an operator to visually recognize a finished state of the photosensitive material for each fixed period and to manually supply a proper quantity of a replenisher based on experience, unlike the conventional method.

Moreover, since precise replenishment is realized by the present invention, the quantity of a development processing solution filled in a processing tank can be reduced, and therefore, the processing tank can be made smaller and the replenishment quantity of the developing agent can be reduced, which have been desired.

As the digital photographic printer in which the print image rate is calculated based on the density characteristic value of the image to be exposed as described above, an appropriate replenishment quantity is obtained from the print image rate, and proper replenishment of the developing agent can be effected (which is an example of the developing agent replenishing method according to the present invention), the digital photographic printer according to the following seventh aspect of the present invention is provided.

The seventh aspect of the present invention is constructed such that, in the above-described fifth aspect, the digital data is one of digital image source data and output digital image data obtained due to predetermined image processing being effected for the digital image source data and used for exposure of the photosensitive material, and said density characteristic calculation means is provided to calculate, based on said one of the digital image source data and the output digital image data, the density characteristic value of the image.

In the digital photographic printer of the seventh aspect, the density characteristic value of the image to be exposed is calculated by the density characteristic value calculation means based on the output digital image data or based on the digital image source data, and the print image rate is calculated based on the density characteristic value. For example, by using the three-color average density value of the image (i.e., an example of the density characteristic value) and by referencing a predetermined LUT, the print image rate corresponding to the average density value may also be calculated.

Further, the replenishment quantity of the developing agent is calculated based on the print image rate calculated by the replenishment quantity calculation means, and based on the calculated replenishment quantity, replenishment of the developing agent is effected by the replenishing means.

As described above, in accordance with the digital photographic printer of the seventh aspect, in the same procedure as in the above-described developing agent replenishing method of the above-described fifth and sixth aspects, an appropriate replenishment quantity is calculated so that proper replenishment of the developing agent can be effected. Accordingly, the digital photographic printer of the seventh aspect can achieve the same effects as those of the developing agent replenishing method described in claim 1 of the present invention.

An eighth aspect of the present invention is a processing chemicals replenishing method in which processing chemicals are supplied into a common processing tank in a photographic printer including a plurality of exposure sections in which an image is exposed onto a photosensitive material by light irradiated from a light source, and also including a processing section in which the photosensitive material exposed by any one of the plurality of exposure sections is processed by processing chemicals in the common processing tank, said method comprising the steps of: (a) calculating a separate replenishment quantity of processing chemicals for each of the plurality of exposure sections in which the photosensitive material is exposed, the separate replenishment quantity being provided to correspond to each of the exposure sections in which the photosensitive material is exposed; and (b) calculating, based on the calculated separate replenishment quantity, an actual replenishment quantity of processing chemicals to be supplied to the processing tank.

The above-described processing section corresponds to, for example, a development processing section in which color developing processing is effected, a bleach-fix processing section in which bleach-fix processing is effected, a rinse processing section in which rinse processing is effected, and the like. Accordingly, the processing section and processing chemicals correspond to, for example, a development processing tank provided in the development processing section, and a development processing solution filled therein; a bleach-fix processing tank provided in the bleach-fix processing section, and a bleach-fix processing solution filled therein; a rinse processing tank provided in the rinse processing section, and a rinse processing solution filled therein; and the like.

A ninth aspect of the present invention is a photographic printer including a plurality of exposure sections in which an image is exposed onto a photosensitive material by light irradiated from a light source, and a development processing section in which the photosensitive material exposed by any one of the plurality of exposure sections is developed by a developing agent in a common development processing tank, comprising: identification means which identifies an exposure section, in which the photosensitive material is exposed, among the plurality of exposure sections; separate replenishment quantity calculation means which calculates a replenishment quantity of the developing agent corresponding to the identified exposure section for each identified exposure section; and actual replenishment quantity calculation means which calculates, based on the calculated replenishment quantity, an actual replenishment quantity of the developing agent to be supplied into the development processing tank.

Meanwhile, as the above-described developing agent, for example, a development processing solution can be used. However, the developing agent is not limited to a liquid state, and may be formed in a powdered or solid state.

A tenth aspect of the present invention is constructed such that, in the above-described ninth aspect, the plurality of exposure sections comprises a digital exposure section in which output digital image data is generated due to predetermined image processing being effected for digital image source data, which contains image data representing an image to be exposed and attribute data representing an attribute of the image data, and based on the generated output digital image data, the image is exposed onto the photosensitive material, and also comprises an analog exposure section in which light from the light source is irradiated on any one of an original on which the image is recorded and a photographic film on which the image is recorded and one of reflected light and transmitted light of the irradiated light is projected on the photosensitive material so as to allow the image to be exposed onto the photosensitive material.

An eleventh aspect of the present invention is constructed such that, in the above-described tenth aspect, the analog exposure section includes at least one of a reflection exposure section in which light from the light source is irradiated on the original and the reflected light is projected on the photosensitive material so as to allow the image of the original to be exposed onto the photosensitive material, and a transmission exposure section in which light from the light source is irradiated on the photographic film and the transmitted light is projected on the photosensitive material to allow the image to be exposed onto the photosensitive material.

A twelfth aspect of the present invention is constructed such that, in the above-described tenth or eleventh aspect, said separate replenishment quantity calculation means is provided to selectively execute any one of first calculation processing, second calculation processing, and third calculation processing, wherein the first calculation processing is provided to calculate an image rate of an image to be exposed based on at least one of the image data, the attribute data, and the output digital image data which are contained in the digital image source data, the image rate being a parameter for obtaining, based on at least one of density characteristic of the image to be exposed, depth of the image to be exposed, and contrast of the image to be exposed, a replenishment quantity of the developing agent used for development processing of the image to be exposed, and said first calculation processing is provided to calculate, based on the image rate, a separate replenishment quantity of the developing agent corresponding to the digital exposure section; the second calculation processing is provided to calculate, based on a photometric quantity from one of the original and the photographic film, an image rate of an image, to be exposed, of said one of the original and the photographic film, and based on the calculated image rate, the second calculation processing is provided to calculate a separate replenishment quantity of the developing agent corresponding to the analog exposure section; and the third calculation processing is provided to calculate, based on a previously set image rate, a separate replenishment quantity of the developing agent corresponding to the analog exposure section.

A thirteenth aspect of the present invention further comprises, in any one of the above-described ninth to twelfth aspects, replenishing means which is common to the plurality of exposure sections and effects replenishment of the developing agent for the development processing tank based on the actual replenishment quantity calculated by said actual replenishment quantity calculation means.

In the processing chemicals replenishing method of the eighth aspect of the present invention, a separate replenishment quantity of processing chemicals is calculated, which is used when the photosensitive material exposed in the exposure section, in which exposure is effected, among the plurality of exposure sections for each of these exposure sections.

Here, with regard to the example in which the separate replenishment quantity of the developing agent (an example of processing chemicals), corresponding to image exposure processing in the digital exposure section in which light based on the digital image data of an image to be exposed is used to form an image on the photosensitive material and the image is thereby exposed onto the photosensitive material, the three-color average density is obtained, by using expressions (3) through (6), in association with the sixth aspect of the present invention, and the separate replenishment quantity of the developing agent is obtained, by using expression (2), in association with the first aspect of the present invention. Therefore, a description of this example will be omitted. In the eighth aspect of the present invention, the expression (2) is defined as follows:

P: separate calculated replenishment quantity (ml)
a: standard actual replenishment quantity (ml)
S: processing area ratio
α: control coefficient
G: maximum development ratio of photosensitive material
D: print image rate
$x_0$: standard development ratio
β: photosensitive material factor The standard actual replenishment quantity represented by "a" in the above-described expression means a standard actual replenishment quantity of the developing agent per standard area required when a standard photosensitive material exposed to have a previously set standard development ratio is subjected to development processing.

The processing area ratio represented by S means a processing area ratio of the photosensitive material to a standard area at a timing of calculation of the standard actual replenishment quantity.

The control coefficient represented by a means a contribution ratio of a portion in which the replenishment quantity is changed by the image rate.

The maximum development ratio of the photosensitive material, represented by G, is previously calculated based on a development ratio when solid black image data is exposed.

The print image rate represented by D is calculated, in the present invention, based on data extracted from output digital image data by integration of pixels due to the density of each of the colors being averaged.

The standard development ratio represented by $x_0$ means a development ratio at the time of printing with standard output digital image data being used.

The photosensitive material factor represented by β is a value set in accordance with the type of photosensitive material to be exposed. For example, when a silver-halide photosensitive material having an ordinary white support is used as a standard photosensitive material, it is set that β=1.0, and when a silver-halide photosensitive material having a transparent support for an overhead projector (i.e., OHP), β is set to 1.5.

As described above, separate replenishment quantity P of the developing agent, corresponding to image exposure processing in the digital exposure section, can be calculated. Meanwhile, the quantity of the bleach-fix processing solution to be supplied for the bleach-fix processing section, or the quantity of the rinse processing solution to be supplied for the rinse processing section is set by a replenishing method corresponding to processing quantity.

Further, in the processing chemicals replenishing method of the eighth aspect of the present invention, by obtaining the sum of the above calculated respective replenishment quantities of the processing chemicals to be provided for the exposure sections, the actual replenishment quantity of processing chemicals to be supplied to the processing tank is calculated. Namely, the sum of the separate replenishment quantities corresponds to the actual replenishment quantity of the processing chemicals to be provided for the processing tank common to the plurality of exposure sections.

Subsequently, the processing chemicals of the above calculated actual replenishment quantity may be automatically supplied to the processing tank, or an operator may be caused to supply the processing chemicals of the actual replenishment quantity into the processing tank in such a manner that the actual replenishment quantity is displayed on a display or the like, or is reported to the operator vocally.

As described above, in accordance with the above-described eighth aspect, when the photosensitive material onto which an image is exposed in any one of the plurality of exposure sections is processed in a common processing section, it is assumed that these exposure sections have different states in which processing chemicals are consumed, and the separate replenishment quantity is obtained in a proper calculation method for each of the exposure sections so that an appropriate actual replenishment quantity is calculated. For this reason, the processing chemicals can be maintained in a stabilized state without being affected by the balance of the exposure processing quantity in each exposure section.

Particularly, even when image data whose image rate is generally not uniform (for example, the above-described digital image data) is exposed, an appropriate separate replenishment quantity is calculated based on the image data, and an appropriate actual replenishment quantity of processing chemicals can thereby be calculated. For this reason, the state of the processing chemicals can be stabilized still further.

Further, it is not necessary for an operator to visually recognize a finished state of the photosensitive material for each fixed period and to manually replenish a proper quantity of processing chemicals based on experience.

Moreover, since precise replenishment is realized by the present invention, the quantity of processing chemicals can be reduced, and therefore, the processing tank can be made smaller and the replenishment quantity of the processing chemicals can be reduced, which is now preferable.

Next, as the photographic printer which executes the processing chemicals replenishing method of the eighth aspect, the photographic printer of the ninth aspect of the present invention is provided. In this aspect of the photographic printer, an exposure section, in which exposure is effected, among the plurality of exposure sections is identified by the identification means, and a separate replenishment quantity of the developing agent corresponding to the identified exposure section is calculated by the separate replenishment quantity calculation means for each of the identified exposure sections. Subsequently, based on the calculated separate replenishment quantity (for example, by obtaining the sum of the calculated separate replenishment quantities), the actual replenishment quantity of the developing agent to be supplied into the development processing tank is calculated by the actual replenishment quantity calculation means.

The exposure section in the photographic printer of the ninth aspect can be formed in the same way as in the above-described tenth aspect.

Particularly, the analog exposure section can be formed in the same way as in the eleventh aspect of the present invention.

Namely, the exposure section may be formed from the digital exposure section and the reflection exposure section, or may be formed from the digital exposure section and the transmission exposure section. Alternatively, the exposure section may also be formed from the digital exposure section, the reflection exposure section, and the transmission exposure section.

When the exposure section is formed from the digital exposure section, the reflection exposure section, and the transmission exposure section (as an example of the eleventh aspect of the present invention), so long as the structure shown in the twelfth aspect of the present invention is provided, an appropriate separate replenishment quantity of processing chemicals can be calculated by the identification means for each of the identified exposure sections.

Further, when, as in the photographic printer of the thirteenth aspect of the present invention, replenishing means common to the plurality of exposure sections is further provided in which replenishment of the developing agent for the development processing tank is effected based on the actual replenishment quantity calculated by the actual replenishment quantity calculation means, proper replenishment of the developing agent based on the appropriate actual replenishment quantity can be automatically effected. In this case, based on the separate replenishment quantity of the processing chemicals corresponding to each of the plurality of exposure sections, a uniform actual replenishment quantity of processing chemicals for a common processing tank is obtained and replenishment based on the uniform actual replenishment quantity is effected by the replenishing means common to the plurality of exposure sections. For this reason, the structure by which replenishment control and replenishing processing is effected can be replaced by the plurality of exposure sections and the manufacturing cost of the photographic printer can be lowered accordingly.

BRIEF DESCRIPTION OF THE DRAWINGS

FIG. 6 is a diagram for illustrating average density calculation processing of an image formed with a photographic image added to a white background.

FIG. 9 is a flowchart showing a control routine of processing chemicals replenishment processing in the embodiment of the present invention.

FIG. 10 is a table which shows test conditions of comparative tests of gray density of prints obtained before and after replenishment of processing chemicals in a replenishing method based on a print image rate (tests 4 through 6) and in a conventional replenishing method only based on a processing quantity (tests 1 through 3).

FIG. 11 is a table which shows test results of the comparative tests of gray density of prints obtained before and after replenishment of processing chemicals in the replenishing method based on the print image rate (tests 4 through 6) and in the conventional replenishing method only based on the processing quantity (tests 1 through 3).

FIG. 19 is a flowchart showing a subroutine of a separate replenishment quantity calculation operation for exposure processing in the digital exposure section in the third embodiment of the present invention.

FIG. 21 is a flowchart showing a subroutine of a separate replenishment quantity calculation operation for exposure processing in the film exposure section in the third embodiment of the present invention.

DESCRIPTION OF THE PREFERRED EMBODIMENTS

Referring now to the attached drawings, a first embodiment of the present invention will be described hereinafter.

Figure 1:
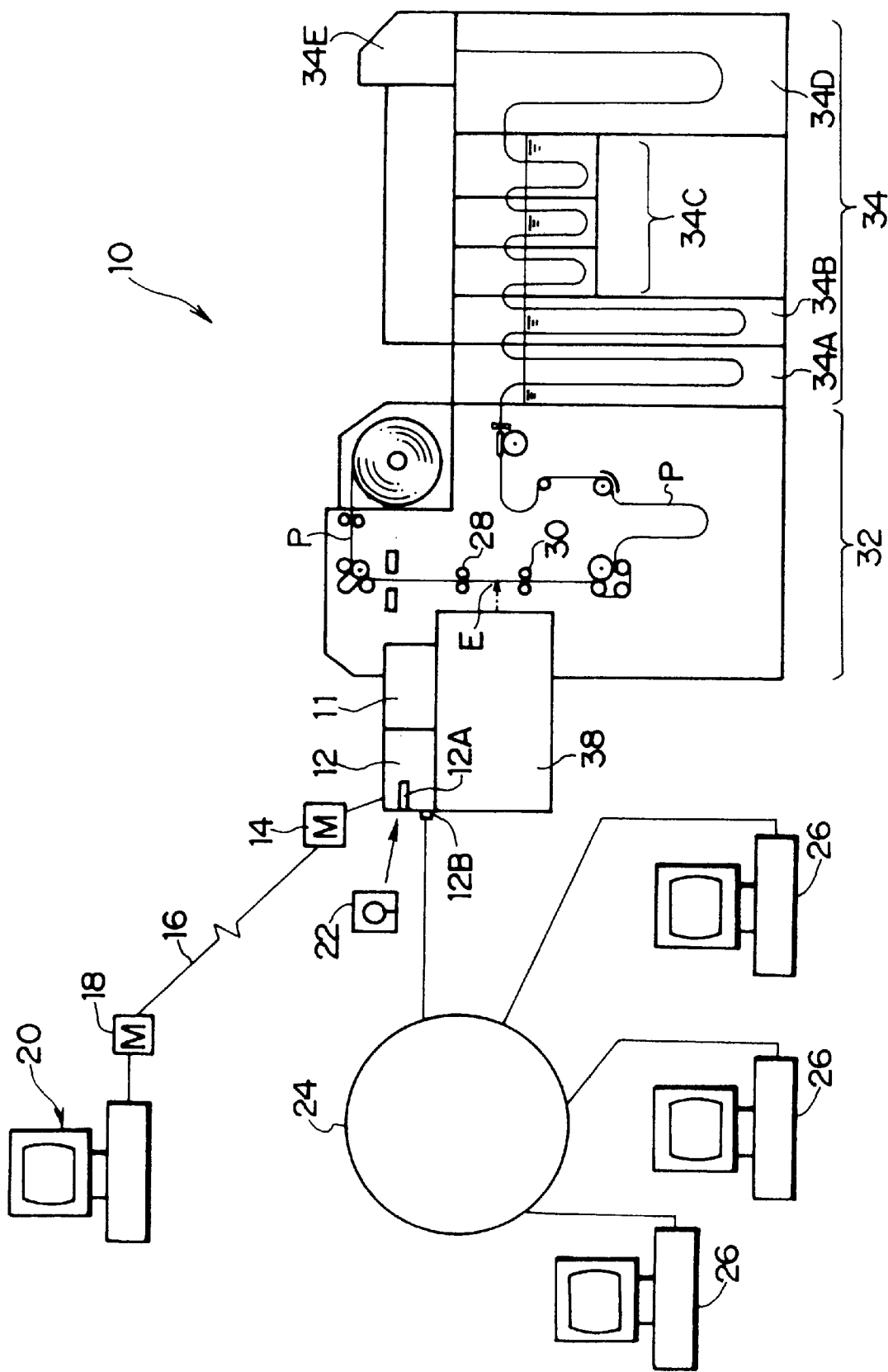
FIG. 1 is an overall structural diagram of a printer processor according to a first embodiment of the present invention.

FIG. 1 shows an overall structure of a printer processor 10 which is an example of a digital photographic printer according to the first embodiment of the present invention. The printer processor 10 includes a frame image reading portion 11, a data input portion 12, and an exposure device 38. The frame image reading portion 11 reads each of frame images on a photographed negative film, the data input portion 12 inputs digital image data from an external information processing apparatus or the like, and the exposure device 38 is provided to effect exposure processing based on digital image data of frame images read by the frame image reading portion 11 or digital image data input via the data input portion 12. Further, the printer processor 10 also includes an exposure section 32 in which a color paper P to be exposed is conveyed, and a processing section 34 in which wet development processing is effected.

Figure 2:
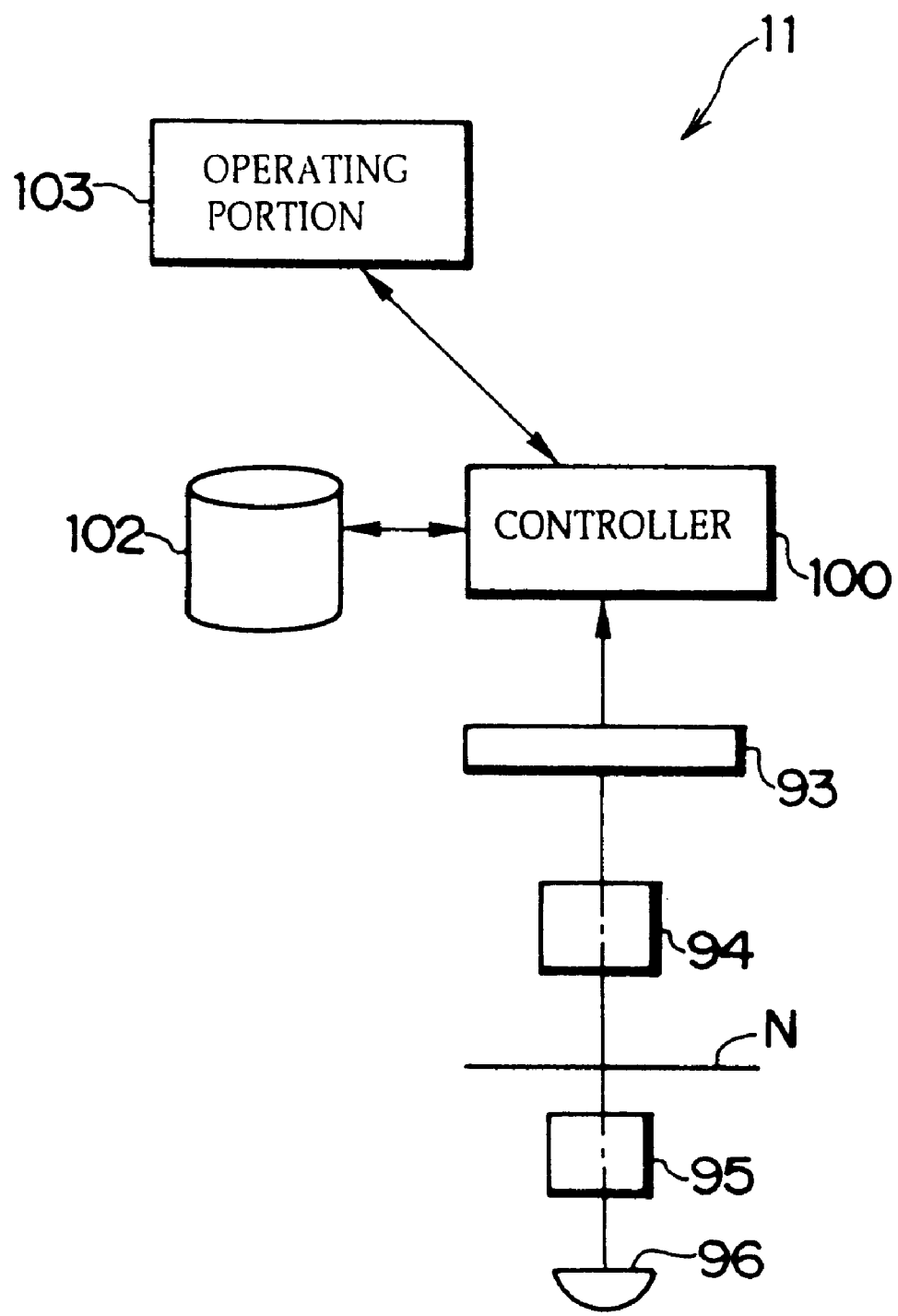
FIG. 2 is a schematic structural diagram of a frame image reading portion.

As shown in FIG. 2, the frame image reading portion 11 includes a light source 96 formed by a halogen lamp or the like, and also includes a diffusion barrel 95, a lens 94, and a CCD area sensor 93, which are arranged sequentially along the direction in which light is emitted from the light source 96. A negative film N on which an image frame to be read is recorded is set at a predetermined read position between the diffusion barrel 95 and the lens 94. The light from the light source 96 is transmitted through the frame of the negative film N and the transmitted light is focused on the CCD area sensor 93 by the lens 94. At this time, the frame image of the negative film N is imaged on and read by the CCD area sensor 93. The image read by the CCD area sensor 93 is subjected to analog-digital conversion (hereinafter referred to as "A/D conversion") by a controller 100 formed to include a microcomputer, and thereafter, the converted image is subjected to various image processing (described later) and is stored in an image memory 102.

The data input portion 12 is disposed adjacent to the frame image reading portion 11. The data input portion 12 is provided with a floppy disk drive 12A for reading image data or the like, stored in a floppy disk 22, and a digital data input port 12B. Namely, with the floppy disk 22 into which digital image data is written by an external image processing apparatus or the like being inserted in the floppy disk drive 12A, the digital image data stored on the floppy disk 22 can be read for input to the controller 100. Further, when the digital data input port 12B is connected to a local area network (LAN) 24, the data input portion 12 can receive digital image data transmitted from each of image processing apparatuses 26 connected to LAN 24 to allow the digital image data to be input to the controller 100. Moreover, with the data input portion 12 being connected to an external image processing apparatus 20 via a modem (modulator/demodulator) 14, an analog communication line 16, and a modem 18, the data input portion 12 can also receive digital image data from the image processing apparatus 20 by a communication network via an analog communication line 16 to allow the digital image data to be input to the controller 100.

Figure 3:
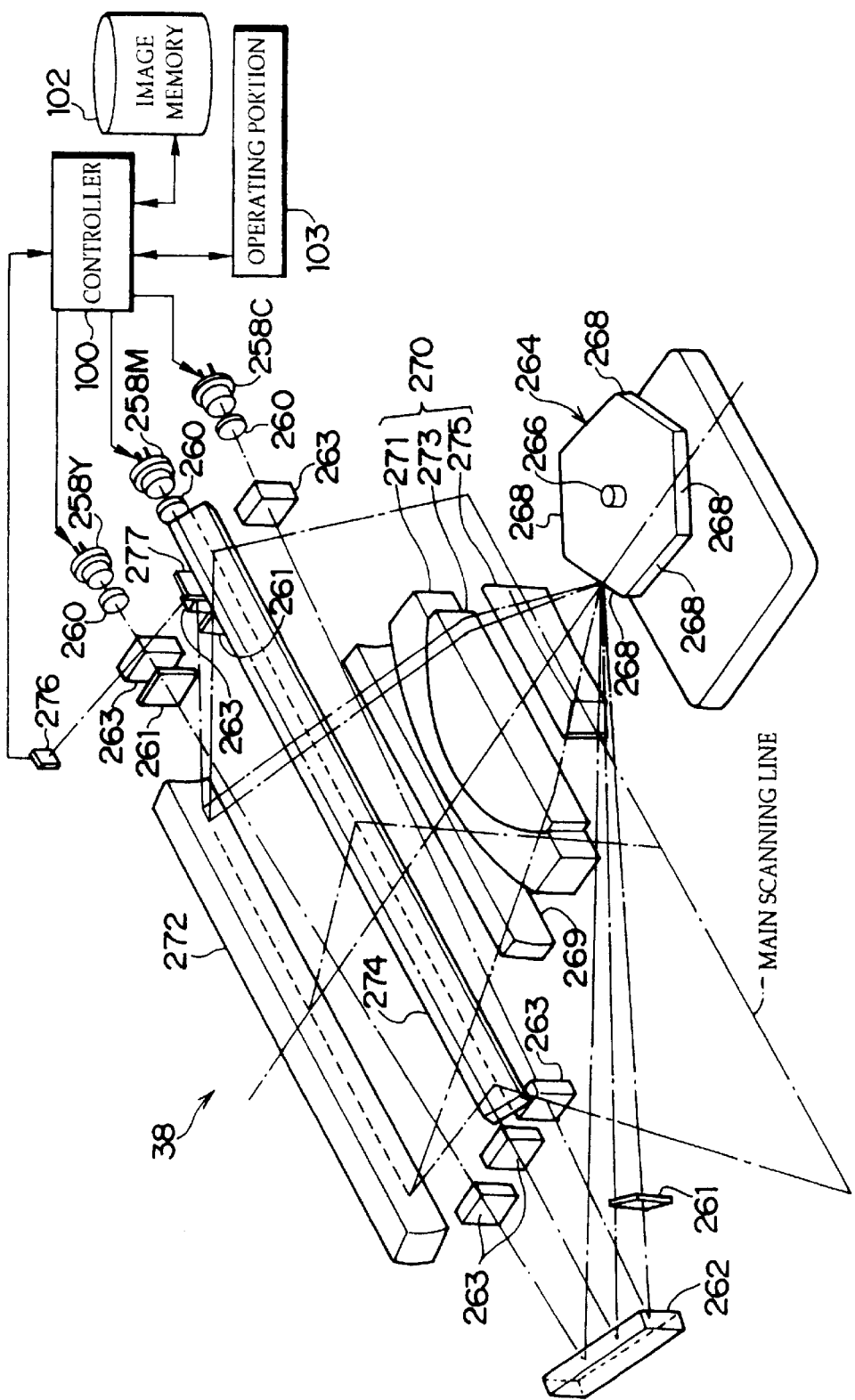
FIG. 3 is a schematic structural diagram of an exposure device.

Further, the printer processor 10 includes the exposure device 38 disposed adjacent to the data input portion 12 and to the image frame reading portion 11. As shown in FIG. 3, the exposure device 38 is provided with a semiconductor laser 258C (whose light emission wavelength is 750 nm) serving as a light source for cyan coloring, a semiconductor laser 258M (whose light emission wavelength is 680 nm) serving as a light source for magenta coloring, and a semiconductor laser 258Y (whose light emission wavelength is 810 nm) serving as a light source for yellow coloring.

The controller 100 is connected to each of the semiconductor lasers 258C, 258M, and 258Y and is provided to control, based on digital image data to be exposed, emission timing and intensity of a light beam emitted from each of the semiconductor lasers. Connected to the controller 100 are the image memory 102 and an operating portion 103 formed by a keyboard, a button, or the like (not shown). The image memory 102 stores the digital image data to be exposed, and the like, and the operating portion 103 is used by an operator to effect operational instructions or the like, for example, a start or stop operation of various processing.

The controller 100 reads the digital image data of an image to be exposed from the image memory 102 and controls an electric current supplied for each of the semiconductor lasers 258C, 258M, and 258Y such that a light beam based on the digital image data is emitted at an appropriate emission timing and at an appropriate light intensity.

Further, the controller 100 is also connected to a transfer system of the color paper P in FIG. 1 by a signal line (not shown) so as to effect control so that transfer timing of the color paper P is synchronized with an emission timing of the light beam from each of the above-described semiconductor lasers.

A collimator lens 260 is provided in each of the vicinities of the semiconductor lasers 258C, 258M, and 258Y at the side where the light beam is emitted from each semiconductor laser and is also used to convert the light beam emitted from each of the semiconductor lasers 258C, 258M, and 258Y from a diffused light beam to a parallel light beam. The light beam, made into the parallel light beam by each collimator lens 260, from each of the semiconductor lasers 258C, 258M, and 258Y are made incident on a reflecting mirror 262 via a cylindrical lens group 263 and a light-quantity adjustment filter 261, and is reflected by the reflecting mirror 262, and is thereafter focused on a reflecting surface 268 of a polygon mirror 264. The cylindrical lens 263 has a function of reshaping a light beam in a subscanning direction.

Further, the polygon mirror 264 includes six reflecting surfaces 268 and rotates at high speed (as an example, 125 rotations per second) around a shaft 266 by driving force from a motor (not shown) to continuously change to deflect an incident angle of a light beam on each of the reflecting surfaces 268. Namely, the polygon mirror 264 deflects light beams by the reflecting surfaces 268 so as to allow light beams to be scanned in the main scanning direction.

An f θ lens system 270 is disposed in a traveling direction of the light beams deflected by the polygon mirror 264 and is used to cause the deflected light beams (namely, the light beam for yellow coloring, the light beam for magenta coloring, and the light beam for cyan coloring) to be each focused on the color paper P in the exposure section 32. The f θ lens system 270 is formed from lenses 271, 273, and 275 and provides optical adjustment so that respective image forming points, on the color paper P, of the light beam for yellow coloring, the light beam for magenta coloring, and the light beam for cyan coloring coincide with one another and so that the coincident image forming point moves on the color paper P at a uniform velocity.

A cylindrical lens 269 and a cylindrical mirror 272 are sequentially disposed in the traveling direction of light beams transmitted through the f θ lens system 270 from the side of the f θ lens system 270 and a reflecting mirror 274 is disposed in the traveling direction of light beams reflected by the cylindrical mirror 272. The reflecting mirror 274 is inclined at a predetermined angle so that the light beams reflected by the surface thereof are reflected substantially in a vertically downward direction.

A start-of-scan (SOS) mirror 277 is disposed at the side of the reflecting mirror 274 and the light beam reflected by the polygon mirror 264 is first irradiated on the SOS mirror 277. The light beam first irradiated on the SOS mirror 277 (i.e., light beam corresponding to a main scanning start point and its vicinity) is reflected so as to be made incident on an SOS sensor 276. When the light beam from the SOS mirror 277 is made incident on the SOS sensor 276, the SOS sensor 276 outputs a predetermined signal and the output signal is input to the controller 100, by which SOS is detected.

A light beam based on the digital image data from the exposure device 38 are made incident on the color paper P at the position indicated by arrow E in FIG. 1, the color paper P being conveyed by conveying rollers 28, 30, and the like along a predetermined transfer path in the exposure section 32 of the printer processor 10, and an image is thereby exposed onto the color paper P. The exposed color paper P is conveyed to the processing section 34.

The processing section 34 includes a color development processing tank 34A in which a color development processing solution is filled, a bleach-fix processing tank 34B in which a bleach-fix processing solution is filled, a rinse processing tank 34C in which a rinse processing solution is filled, a drying section 34D in which drying processing for the color paper P is effected by using hot air or the like, and a cutting section 34E for cutting the color paper P for each frame. The exposed color paper P is subjected to development processing, fix processing, and rinse processing while being sequentially conveyed through the color development processing tank 34A, the bleach-fix processing tank 34B, the plurality of rinse processing tanks 34C, and is thereafter subjected to drying processing by hot air or the like in the drying section 34D. Moreover, when the color paper P subjected to various processing is cut for each frame, photographic prints on which images are recorded are prepared.

Figure 4:
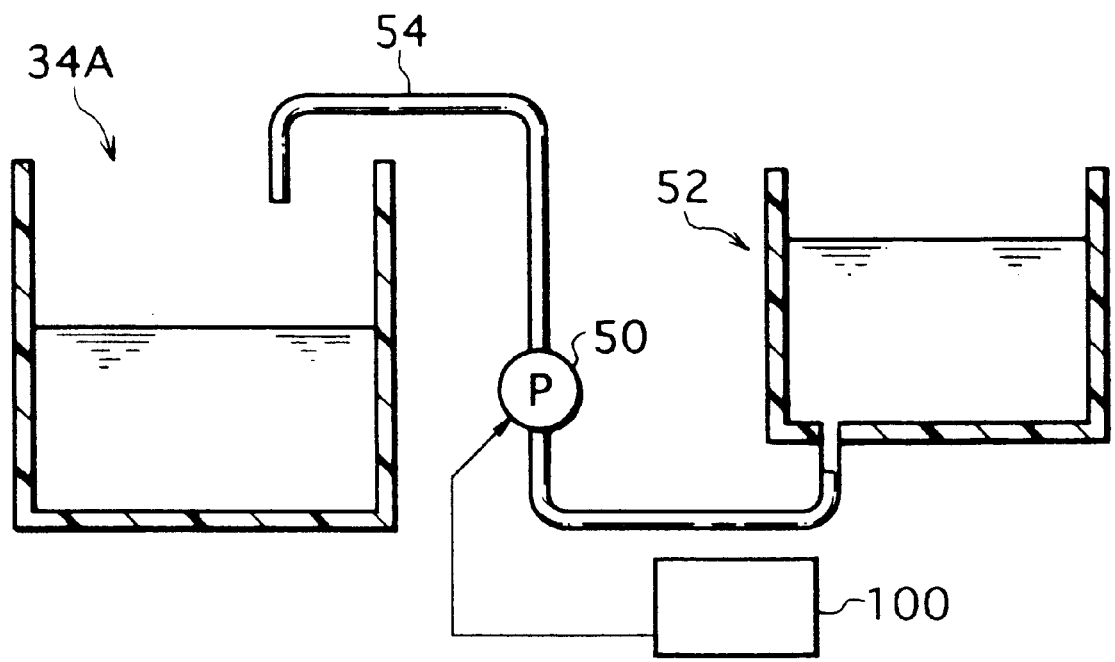
FIG. 4 is a diagram showing a structure for replenishment of a processing agent for each processing tank.

Here, a structure for replenishment of a color development processing solution for the color development processing tank 34A in the processing section 34 will be described with reference to FIG. 4. As shown in FIG. 4, a replenisher of the color development processing solution to be supplied for the color development processing tank 34A is supplied in advance to a replenisher tank 52 provided to correspond to the color development processing tank 34A, and when a pump 50 is actuated as occasion demands, the replenisher is provided for the color development processing tank 34A.

More specifically, one end of a pipe 54 is provided to be opened above the color development processing tank 34A and the other end of the pipe 54 is connected to a bottom portion of the replenisher tank 52. Further, the pump 50 is connected to an intermediate portion of the pipe 54 and drive of the pump 50 is controlled by the controller 100. Namely, during replenishment for the color development processing tank 34A, the controller 100 controls to actuate the pump 50 so that the replenisher in the replenisher tank 52 is supplied for the color development processing tank 34A.

Next, a description will be given of a functional block diagram shown in FIG. 5 with regard to exposure operation control and replenishing operation control of the controller 100 in the printer processor 10.

Figure 5:
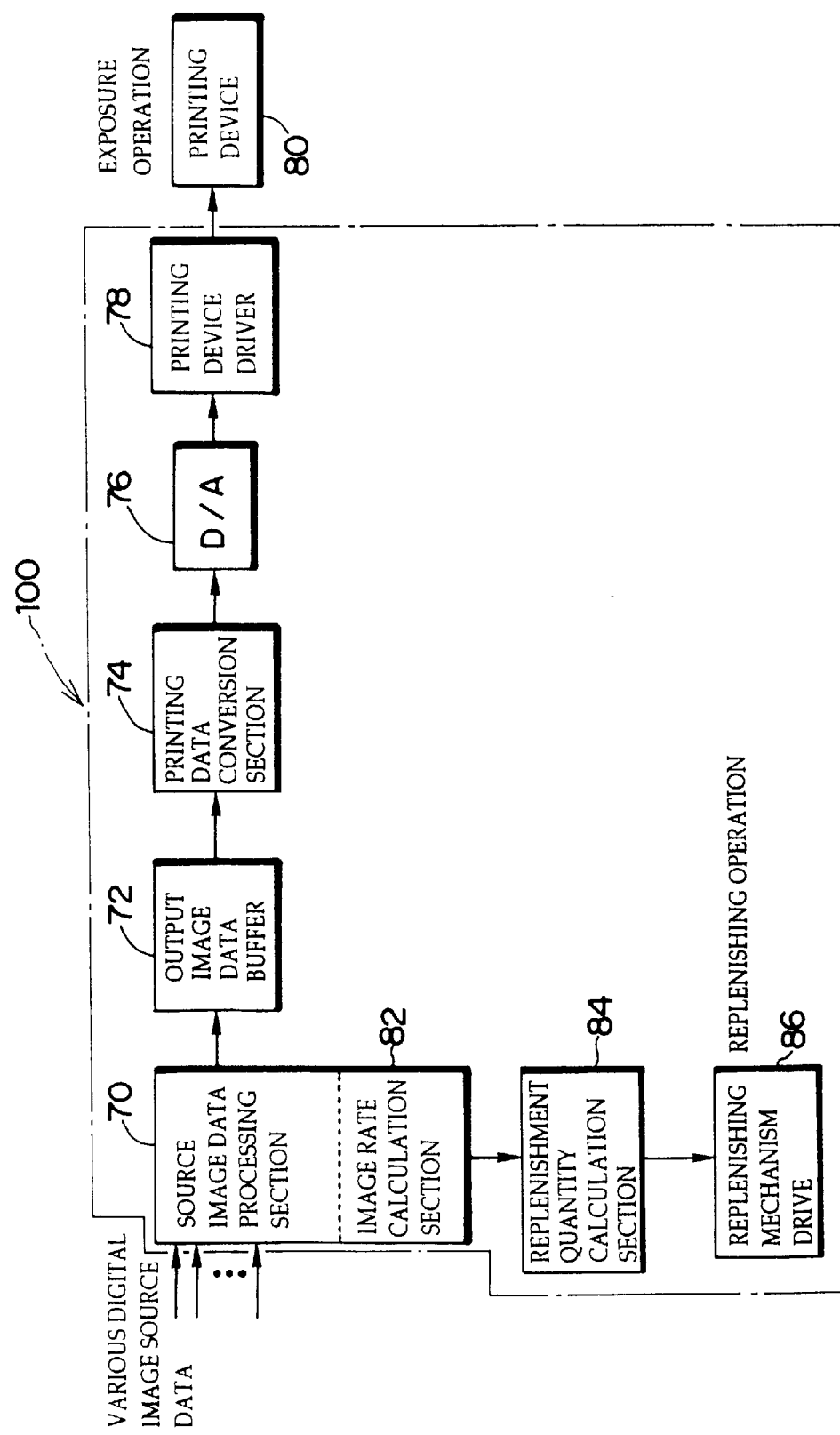
FIG. 5 is a functional block diagram for an exposure operation and a replenishing operation in the embodiment of the present invention.

A source image data processing section 70 shown in FIG. 5 converts various digital image source data by suitable image processing to print density data, and outputs the print density data to an output image data buffer 72. As an example, negative scanning image data is input to the source image data processing section 70 and is subjected to predetermined image processing (negative/positive conversion, density correction calculation, gradation conversion, color conversion calculation, log calculation, variable power processing, and the like), and thereafter, processed image data is output to the output image data buffer 72 to be arranged as output digital image data.

Other digital image source data includes positive scanning image data (i.e., image data obtained by scanning a positive source by a sensor of a built-in scanner), image data input to the above-described data input portion 12 via the floppy disk drive 12A, the digital data input port 12B, the analog communication line 16, and the like (i.e., image data in bit map form, vector form, and character form).

In other words, the sequence of image processing calculation and the image processing method are not limited to the above-described example and the image processing calculation, the image processing method, and expansion to the output digital image data in accordance with each format of the digital image source data may be effected.

A printing data conversion section 74 reads the output digital image data from the output image data buffer 72, and converts the output digital image data to data suitable for a printing device 80. As an example, negative-positive conversion, reverse log conversion, gradation conversion such as γ correction, or the like are applied.

The data from the printing data conversion section 74 is converted to analog information by a digital-analog converter 76. The output image data converted to analog data is transferred to a printing device driver 78 and is exposed by the printing device 80 driven by the printing device driver 78. Specifically, the controller 100 allows emission of a light beam based on the output image data from each of the semiconductor lasers 258C, 258M, and 258Y shown in FIG. 3 and an image based on the output digital image data is exposed onto the color paper P being conveyed in the exposure section 32 shown in FIG. 1. Meanwhile, for the printing device 80, a cathode-ray tube (CRT), a light emitting diode (LED), and the like may be used in place of the above-described semiconductor laser, but the present invention is not limited to the same.

In order to expand the digital image source data to the output digital image data, the source image data processing section 70 first analyzes attribute data contained in the digital image source data so as to recognize an image size, an image arrangement, and characteristics of image data within the digital image source data. Subsequently, expansion to the output digital image data is effected on the basis of the image processing suitable for the digital image source data. Accordingly, during image processing in the source image data processing section 70, the kind of the image to be processed (i.e., a photographic image, a CG image, a character image, a mixed image having a photograph and characters) or the size of the image can be recognized.

Information of the type and size of the image recognized by the source image data processing section 70 is transferred to an image rate calculation section 82. In the image rate calculation section 82, based on the information of the type and size of the image, an average density $D_A$ is calculated by using the following expression (1) and a density value previously set for each kind of image data in the above-described manner.

$$D_A=((B-F)D_B+FD_F)/B \quad (1)$$

Wherein, $D_B$ indicates background density, $D_F$ indicates image density, B indicates print size, and F indicates image size.

Figure 7:
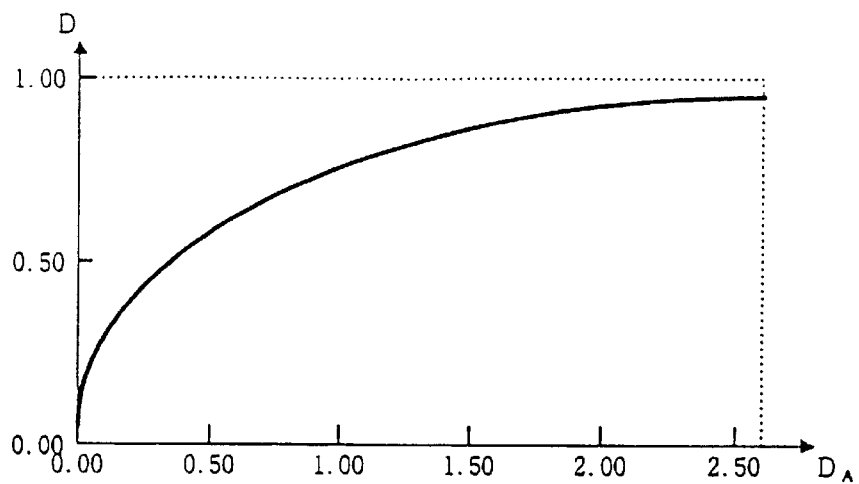
FIG. 7 is a diagram showing LUT data for obtaining a print image rate from an average density of an image.

Further, in the image rate calculation section 82, by referring to LUT shown in FIG. 7 which shows correspondence between the density and the print image rate, the print image rate D is calculated from the above calculated average density $D_A$.

Information of the calculated print image rate D is transferred to a replenishment quantity calculation section 84, in which a replenishment quantity is calculated by the following expression (2);

$$P=aS(1+\alpha(GD/x_0-1))\beta \quad (2)$$

wherein, P indicates calculated replenishment quantity (ml), a indicates standard replenishment quantity (ml), S indicates processing area ratio, α indicates control coefficient, G indicates maximum development ratio of photosensitive material, D indicates a print image rate, $x_0$ indicates a standard development ratio, and β indicates photosensitive material factor.

However, the replenishment quantity calculation section 84 may also calculate the replenishment quantity in such a manner as follows: on the basis of a print image rate table which shows correspondence between the print image rate previously set at values of several grades and a replenishment quantity per unit processing area, the replenishment quantity per unit processing area corresponding to the above calculated print image rate is obtained and a replenishment quantity to be supplied is calculated from the replenishment quantity per unit processing area and an actual processing area.

Subsequently, a replenishing operation is effected by a replenishing mechanism driver 86 on the basis of the calculated replenishment quantity. Specifically, the controller 100 operates the pump 50 shown in FIG. 4 to supply a replenisher from the replenisher tank 52 for the color development processing tank 34A.

Next, an operation of the first embodiment of the present invention will be described. The calculation processing of the print image rate and the replenishment quantity and the replenishment control processing, to be effected by the controller 100, will be described with reference to FIG. 9.

In FIG. 9, step 202 takes in the digital image source data via the data input portion 12. In the subsequent step 204, by analyzing the attribute data contained in the digital image source data, the image size, the image arrangement, and characteristics of image data within the digital image source data are recognized (see the operation of the source image data processing section 70 in the functional block diagram shown in FIG. 5).

For example, when a TIFF-PCD format image data represented by the above-described photographic image data is expanded to form the output digital image data and an image based on the output digital image data is exposed onto the photosensitive material, by analyzing an extension of an image file format or the attribute data at the time of expansion of the digital image source data to the output digital image data, the print size, image size, and the kind of image data format of the image are recognized as those of a graphic image or a photographic image.

In the subsequent step 206, when, for example, image data of an image to be exposed is photographic image data attached to the background image data, average density $D_A$ is calculated by using the following expression (1) and the density value previously set for each type of image data.

$$D_A=((B-F)D_B+FD_F)/B \quad (1)$$

wherein, $D_B$ indicates background density, $D_F$ indicates image density, B indicates print size, and F indicates image size.

As an example, when the image data with a photographic image being attached to a white background as shown in FIG. 6 is used, background density DB and photographic image density $D_F$ of the image data are previously set at 0 and 0.95, respectively. At this time, when, for example, a photographic image of octavo size is exposed onto a printing paper of sixmo size, the image size F is set at 0.69 with respect to the print size B being set at 1. For this reason, the average density $D_A$ can be calculated to be 0.66 by the above-described expression (1).

Figure 8:
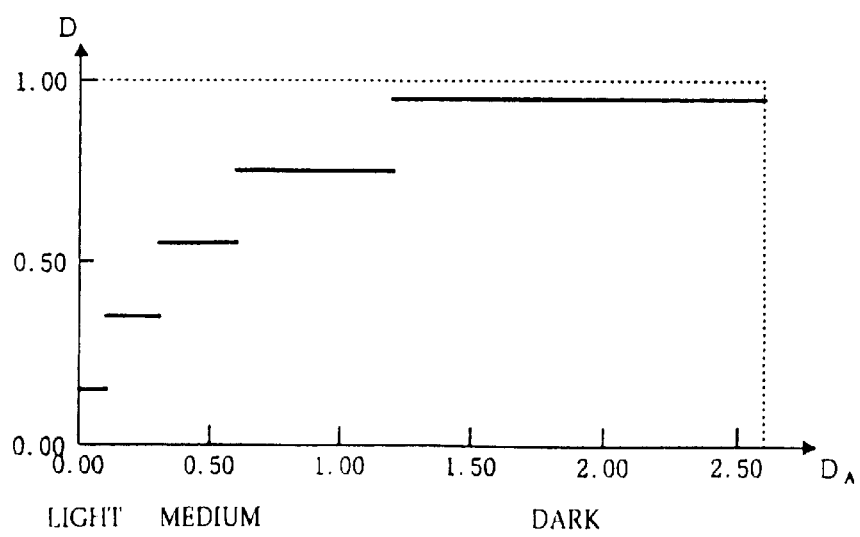
FIG. 8 is a diagram showing LUT data when the print image rate is set at values of several grades.

In the subsequent step 208, for example, by referring to the LUT shown in FIG. 7 which shows correspondence between the density and the print image rate, print image rate D is calculated from average density $D_A$ (see the operation of the image rate calculation section 82 in the functional diagram shown in FIG. 5). However, with the table shown in FIG. 8 being used in which the image rate being set at values of several grades, the image rate may also be obtained from a schematic determination of density level: dark, slightly dark, medium, slightly light, and light.

After the above-described calculation of the print image rate D, the process proceeds to step 210, in which the replenishment quantity of a developing agent is calculated by the following expression (2) described above (see the operation of the replenishment quantity calculation section 84 in the functional block diagram shown in FIG. 5).

$$P = aS(1 + \alpha(GD/x_0 - 1))\beta \quad (2)$$

wherein, P indicates calculated replenishment quantity (ml), a indicates standard replenishment quantity (ml), S indicates processing area ratio, $\alpha$ indicates control coefficient, G indicates maximum development ratio of photosensitive material, D indicates print image rate, $x_0$ indicates standard development ratio, and $\beta$ indicates photosensitive material factor.

Meanwhile, step 210 may also calculate the replenishment quantity in such a manner that, based on the print image rate table which shows correspondence between the print image rate previously set at values of several grades and a replenishment quantity per unit processing area, the replenishment quantity per unit processing amount corresponding to the above calculated print image rate is obtained and a replenishment amount to be supplied is calculated from the replenishment quantity per unit processing area and an actual processing area.

In step 212, the above calculated replenishment quantity is integrated and in the subsequent step 214, a determination is made as to whether a predetermined replenishment timing has come. In this case, for example, the determination may be made that the replenishment timing has come due to the fact that the integrated replenishment quantity has been set at a predetermined value or greater, or due to the fact that a predetermined time or more has elapsed after the previous replenishment in an interval time.

When the decision of step 214 is no, the process returns to step 202. On the other hand, when the decision of step 214 is yes, the process proceeds to step 216, in which the pump 50 shown in FIG. 4 is actuated so that, for example, a replenisher of the above integrated replenishment quantity is supplied from the replenisher tank 52 to the color development processing tank 34A (see the operation of the replenishing mechanism driver 86 in the functional diagram shown in FIG. 5).

As described above, in the present embodiment, a development factor of a photosensitive material, by which the replenishment quantity of the developing agent for the photosensitive material is affected, is replaced by a print image rate obtained from the attribute data of digital image source data of an image to be actually printed and an optimum replenishment quantity is supplied on the basis of the print image rate. As a result, the optimum processing conditions can be maintained and a finished state after processing can be made uniform.

In the foregoing, the image rate is calculated based on the basis of the attribute data of the digital image source data required for printing. For this reason, installation of a sensor for obtaining an image rate as shown in the technique described in Japanese Patent Application (JP-A) No. 2-146038 is not required, which is advantageous in cost. Further, the image rate for image data which cannot be read by a sensor (for example, a CG image) can also be obtained.

Among the digital image source data, attribute data whose data volume is smaller than that of image data is used to effect calculation processing for the image rate, replenishment quantity, and the like. For this reason, as compared with a case in which calculation processing of image rate, replenishment quantity, and the like is effected by using the above-described image data, simple and high-speed processing can be achieved.

Further, so long as the parameters for calculation of the replenishment quantity are optimized, it is unnecessary for an operator to visually recognize a finished state of the photosensitive material for each fixed period and to manually supply a proper quantity of a replenisher based on experience, unlike a conventional method.

Moreover, since precise replenishment is realized, the quantity of a processing solution filled in each processing tank can be reduced, and therefore, each processing tank can be made smaller and the replenishment quantity of the developing agent can be reduced.

Meanwhile, in the above-described embodiment, calculation of the replenishment quantity of the developing agent with the above-described various parameters used is performed, during a printing operation, in such a manner as to be synchronized with an operation in which image data is output from the output image data buffer. However, it is not necessary that this timing be set strictly, and the above calculation may be performed at a timing before printing processing on the assumption that printing processing is effected or at a timing in which a plurality of prints is processed together.

In the above-described embodiment, the developing agent was explained by using the replenisher of the development agent, but it may be provided in a powered or solid state.

Further, in the foregoing, during replenishment of the color development processing solution for the color development processing tank 34A, a case in which the color development processing solution with the developing agent dissolving in water or preservatives is replenished was described. However, so long as water or preservatives, and the developing agent are controlled to be supplied independently, more precise replenishment control of the developing agent can be realized, which is thereby more preferable.

Test results

Effects obtained when the replenishment quantity of the developing agent is calculated by using the print image rate as a parameter are indicated below from the results of a simulation experiment based on the test results of the actual processing of the photosensitive material.

The photosensitive material to be subjected to print processing is of sixmo size (8×10) and the output digital image data has three types of A, B, and C (described below).

Image A (print image rate=0.04): a print having sentences described on a white background Image B (print image rate=0.25): a print with two photographs of cabinet size and characters of several lines being synthesized on a white background Image C (print image rate=0.60): a print having a photographic image given on an entire surface thereof First, a photosensitive material onto which a standard gray print had been exposed was processed. Print processing to which the replenishing method of the present invention is applied was performed, and thereafter, the photosensitive material onto which the standard gray print had been exposed was processed again and both gray densities were measured to be compared with each other. As a comparative example, a similar experiment corresponding to a conventional method based on a processing quantity was made for comparison.

As the gray density, a density in light of blue (B), green (G), and red (R) is measured. When the hue of gray does not change due to replenishment of the developing agent, it can be determined that a development processing state in which a stabilized image is constantly obtained is maintained. Accordingly, so long as respective gray densities of the standard gray prints obtained before and after replenishment in this experiment approximate each other, it can be determined that optimum replenishment is effected.

Method and test conditions

The development processing was respectively effected by using a replenishing method using print image rate according to the present invention and a conventional replenishing method corresponding to only the processing amount, and respective gray densities before and after the replenishment test were compared with each other.

The test conditions and test results are respectively shown in FIGS. 10 and 11 in a table form. Note that in FIG. 10 an "embodiment" means a case in which the replenishing method using print image rate according to the present invention is used, and a "comparative example" means a case in which the conventional replenishing method corresponding to only the processing quantity is used.

Further, calculation of the replenishment quantity based on the print image rate was performed by the following expression (2).

$$P = aS(1 + \alpha(GD/x_0 - 1))\beta \qquad (2)$$

The parameters used in the expression (2) are as follows:
a: 19.8 ml/sixmo size
S: 1.00
$\alpha$: 0.70
G: 0.70
D(A): 0.04
D(B): 0.25
D(C): 0.60
$x_0$: 0.25
$\beta$: 1.00

As seen from the test results shown in FIG. 11, tests 1 and 3 (comparative examples) each make a great difference in print gray density before and after each test. On the other hand, tests 4, 5, and 6 (embodiments) each make a small difference in print gray density before and after each test. Namely, the print gray density of a print which has been subjected to standard gray exposure after replenishment based on the print image rate in the present invention approximates to the print gray density of a print which has been subjected to standard gray exposure at the time of start-up of the test, and it can be clearly seen that variable factors of development processing conditions due to bias of the print image rate are suppressed.

As described above, in accordance with the present invention, the development factor of a photosensitive material, by which the replenishment quantity of the developing agent for the photosensitive material is affected, is replaced by an image rate obtained from the attribute data of digital image source data of an image to be actually printed and an optimum replenishment quantity is supplied based on the image rate. As a result, the optimum processing conditions can be maintained and a finished state of the photosensitive material after processing can be made uniform.

Further, since the image rate is calculated based on the attribute data of the digital image source data required for print processing, installation of a sensor used to obtain the image rate, provided in the technique described in JP-A No. 2-146038, becomes unnecessary, which is effective in cost. In addition, the image rate for image data which cannot be read by a sensor (for example, a CG image) can also be obtained.

Moreover, so long as the parameters for calculation of the replenishment quantity are optimized as described above, it is unnecessary for an operator to visually recognize a finished state of the photosensitive material for each fixed period and to manually supply a proper quantity of a replenisher based on experience, unlike the conventional method.

Still further, since precise replenishment is realized by the present invention, the quantity of a processing solution filled in each processing tank can be reduced, and therefore, each processing tank can be made smaller and the replenishment quantity of the developing agent can be reduced, which are preferable.

In addition, in the present invention, among the digital image source data, the attribute data whose data volume is smaller than that of the image data is used to effect calculation processing for the image rate, replenishment quantity, and the like. For this reason, as compared to a case in which calculation processing of image rate, replenishment quantity, and the like is effected by using the above-described image data, simple and high-speed processing can be achieved.

A second embodiment of the present invention will be described hereinafter with reference to FIG. 12. The second embodiment has different function and structure of a controller from those of the controller of the first embodiment, and the function and structure of the controller will be mainly described herein. Further, in the second embodiment, the same structures, members, and components as those of the first embodiment are denoted by the same reference numerals, and a detailed description thereof will be omitted. Moreover, in the second embodiment, the drawings used in the first embodiment will be used as the occasion demands.

By referring now to FIG. 12, a functional block diagram with regard to exposure operation control and replenishing operation control of a controller 100A according to the second embodiment will be described.

Figure 12:
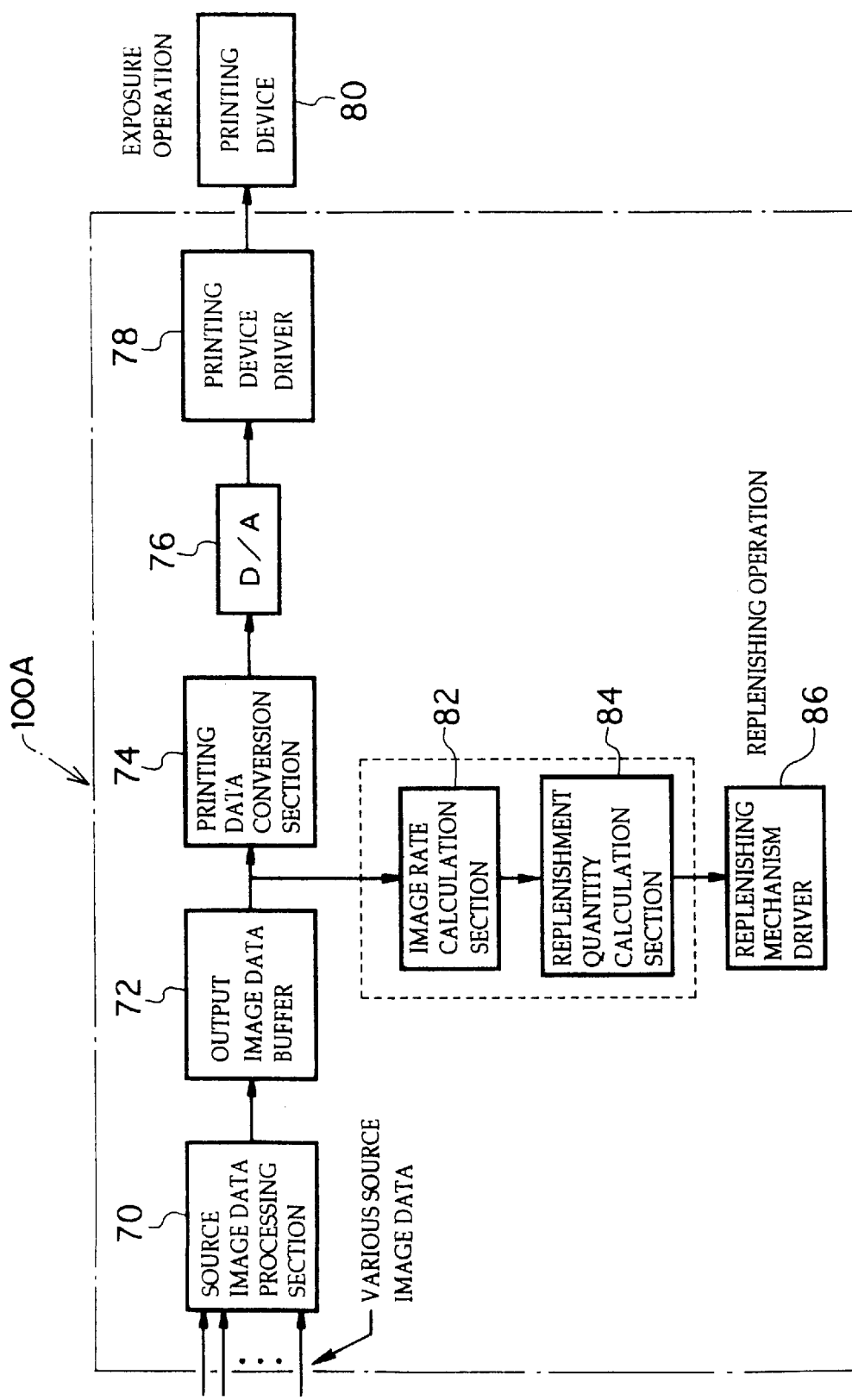
FIG. 12 is a functional block diagram for an exposure operation and a replenishing operation in a second embodiment of the present invention.

In FIG. 12, unlike the first embodiment, the image rate calculation section 82 is connected to the output image data buffer 72 and receives output digital image data from the output image data buffer 72. In the image rate calculation section 82, data is extracted from the output digital image data on the basis of the above-described predetermined extraction rule, and on the basis of the extracted data, the print image rate is calculated. Information of the calculated print image rate is transferred to the replenishment quantity calculation section 84. In the replenishment amount calculation section 84, the replenishment quantity is calculated by, for example, the above-described expression (2).

Other structures of the present invention are the same as those of the first embodiment, and a description thereof will be omitted.

Next, an operation of the second embodiment will be described. First, calculation processing of a print image rate and a replenishment quantity and replenishment control processing, which are to be effected by the controller 100A will be described with reference to FIG. 13.

Figure 13:
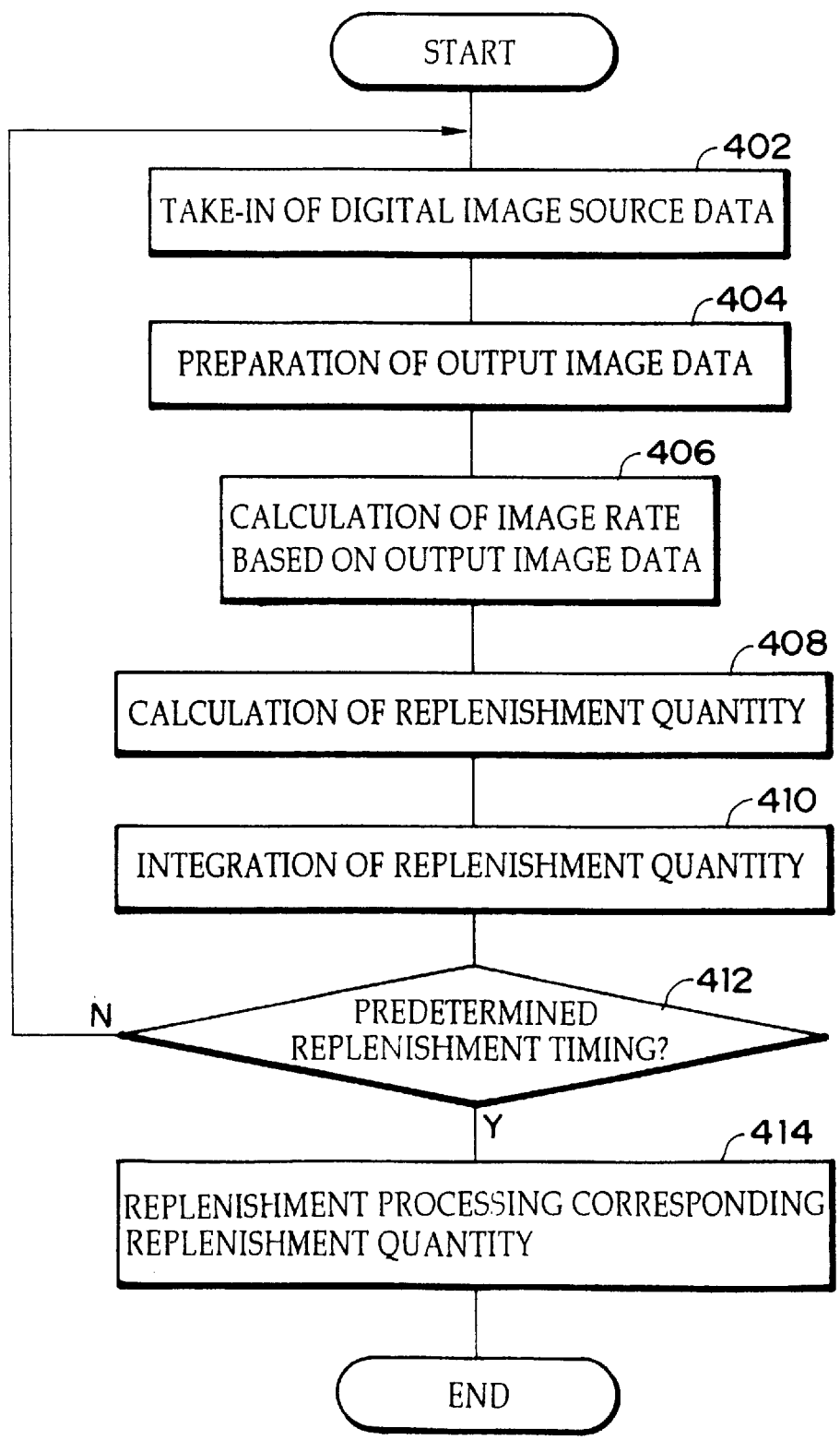
FIG. 13 is a flowchart showing a control routine of a processing chemical replenishing operation in the second embodiment of the present invention.

In step 402 shown in FIG. 13, digital image source data is taken in via the data input section 12. In step 404, the digital image source data is subjected to predetermined image processing so that the output digital image data is prepared (see the operation of the source image data processing section 70 in the functional block diagram shown in FIG. 12). In the subsequent step 206, a print image rate is calculated based on the output digital image data (see the operation of the print image rate calculation section 82 in the functional block diagram shown in FIG. 12).

Calculation of the print image rate in step 406 may be effected in such a manner that, for example, data is extracted from the output digital image data based on the predetermined extraction rule and on the extracted data the print image rate is calculated. Concretely, the following extraction methods can be used: a method of extracting all pixels of the above-described output digital image data; an extraction method with the output digital image data being partly removed (for example, any one pixel is extracted from 1,024 pixels); a method in which density of the output digital image data is locally averaged per unit multiple pixels and the density average value is used as one extraction data; an extraction method with the number of data bits during extraction being reduced so that resolution of data is lowered; and the like.

The average density of each of the colors, R, G, and B is obtained for the extracted data. For example, based on the following expressions (3), (4), and (5), the average density of each of the colors R, G, and B can be obtained. Meanwhile, N indicates the number of all samples for calculation of the average density.

$$D_R = \sum_{n=1}^{N} (D_{Rn})/N \qquad (3)$$

$$D_G = \sum_{n=1}^{N} (D_{Gn})/N \qquad (4)$$

$$D_B = \sum_{n=1}^{N} (D_{Bn})/N \qquad (5)$$

The respective average densities of the three colors obtained as above are averaged and three-color average density $D_A$ is thereby obtained. Namely, three-color average density $D_A$ is obtained by using the following expression (6):

$$D_A = (D_R + D_G + D_B)/3 \qquad (6)$$

Then, by referring to the LUT which shows correspondence between the density and the print image rate, the print image rate corresponding to the three-color average density can be obtained. Further, even if the data format of the output digital image data is linear image data, the print image rate can be obtained in accordance with the data format. Namely, in the present invention, the data format and extraction method of the output digital image data during calculation of the print image rate are not limited to the foregoing.

In order to make the above-described extraction method and the characteristics of the format of the extracted data for calculation of the print image rate fit for the print image rate, by using LUT of the first embodiment shown in FIG. 7, print image rate D to be used for calculation of the replenishment quantity is calculated from three-color average density $D_A$.

As described above, after calculation of print image rate D in step 406, the process proceeds to step 408, in which a replenishment quantity of the developing agent is calculated by the following expression (2) described above (see the operation of the replenishment quantity calculation section 84 in the functional block diagram shown in FIG. 12).

$$P = aS(1 + \alpha(GD/x_0 - 1))\beta \qquad (2)$$

Meanwhile, in step 408, calculation of the replenishment quantity may be effected in such a manner that, based on the print image rate table which shows correspondence between a print image rate previously set at values of several grades and a replenishment quantity per unit processing area, the replenishment quantity per unit processing area which corresponds to the calculated print image rate is obtained and the replenishment quantity to be supplied is calculated from the replenishment quantity per unit processing area and an actual processing area.

In subsequent step 410, the above-described calculated replenishment quantity is integrated. Further, in step 412, it is determined whether or not a predetermined replenishment timing has been reached. At this time, for example, the determination may be made that the replenishment timing has been reached due to the fact that the integrated replenishment quantity has been set at a predetermined value or greater, or due to the fact that a predetermined time or more has elapsed after the previous replenishment in an interval time.

When the decision of step 412 is no, the process returns to step 402. On the other hand, when the decision of step 412 is yes, the process proceeds to step 414, in which the pump 50 shown in FIG. 4 is actuated so that, for example, a replenisher of the integrated replenishment quantity is supplied from the replenisher tank 52 to the color development processing tank 34A (see the operation of the replenishing mechanism driver 86 in the functional block diagram shown in FIG. 12).

As described above, in accordance with the present embodiment, the development factor of a photosensitive material, by which the replenishment quantity of the developing agent for the photosensitive material is affected, is replaced by a print image rate obtained from the output digital image source data of an image to be actually printed and an optimum replenishment quantity is supplied on the basis of the print image rate. As a result, optimum processing conditions can be maintained and a finished state of the photosensitive material after processing can be made uniform.

Further, since the print image rate is calculated based on the output digital image, installation of a sensor used to obtain the print image rate becomes unnecessary, which is effective in cost. In addition, the print image rate for image data which cannot be read by a sensor (for example, a CG image) can also be obtained.

Moreover, so long as the parameters for calculation of the replenishment quantity are optimized as described above, it is unnecessary for an operator to visually recognize a finished state of the photosensitive material for each fixed period and to manually supply a proper quantity of a replenisher based on experience in the same way as in the first embodiment.

Other operations and effects of the second embodiment are the same as those of the first embodiment, and a description thereof will be omitted.

Further, in the second embodiment, the print image rate is calculated on the basis of the output digital image data. However, as shown in FIG. 5 which illustrates the first embodiment, during a process in which input digital image source data is processed to form the output digital image data in the source image data processing section 70, namely, based on the digital image source data, the print image rate may be calculated by the print image rate calculation section 82. Further, the present invention is not limited to the examples shown in FIGS. 12 and 5, and a structure, in which data converted by the printing data conversion section 74 is transferred to the print image rate calculation section 82 and based on the transferred data the print image rate is calculated, may also be used.

A description will be hereinafter given of a third embodiment of the present invention. Note that the same structures, members, and components as those of the first embodiment will be denoted by the same reference numerals, and a detailed description thereof will be omitted.

Figure 14:
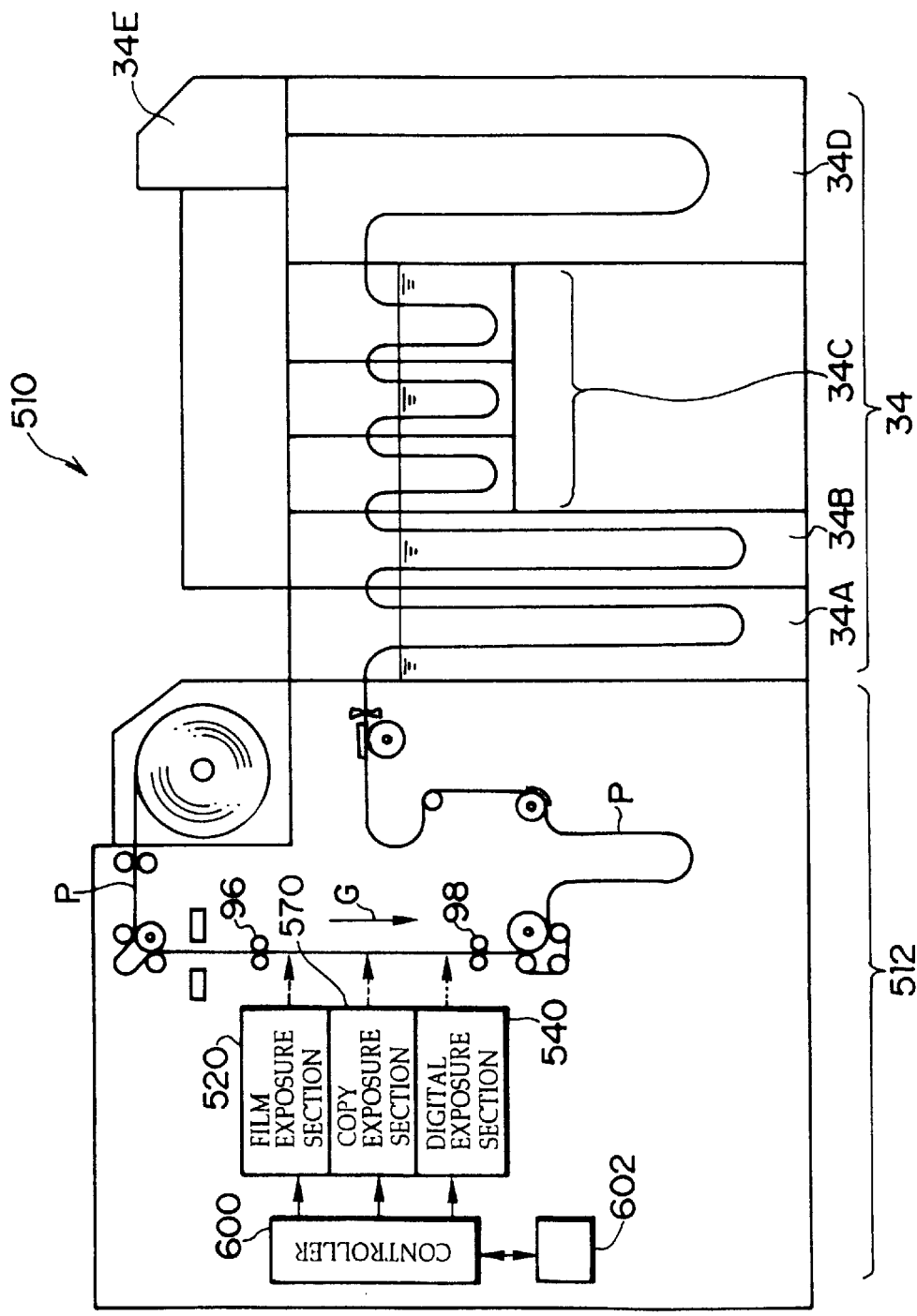
FIG. 14 is an overall structural diagram of a printer processor according to a third embodiment of the present invention.

FIG. 14 shows an overall structure of a printer processor 510 which is an example of a photographic printer according to the third embodiment. The printer processor 510 includes a film exposure section 520, a copy exposure section 570, and a digital exposure section 540. The film exposure section 520 effects exposure for each of frame images on an exposed negative film, the copy exposure section 570 effects exposure for an image of one photographic print mounted at a predetermined position or for a composite image of a plurality of photographic prints, and the digital exposure section 540 effects exposure on the basis of the digital image data such as an CG image. Meanwhile, the film exposure section 520 forms a transmission exposure section and the copy exposure section 570 forms a reflection exposure section.

Further, the printer processor 510 also includes an exposure section 512, a development processing section 34, a controller 600, and an external storage device 602. The exposure section 512 is constructed in that the color paper P is conveyed along a predetermined path and is exposed by each of the above-described exposure sections, the development processing section 34 is provided to effect wet-type development processing, the controller 600 is provided to control various processing in the printer processor 510, for example, various exposure processing, development processing, processing-solution replenishing process (described below), and the like, and the external storing device 602 is connected to the controller 600 and stores various digital image data and the like.

Next, the structure of each of the above-described exposure sections will be described.

Figure 15:
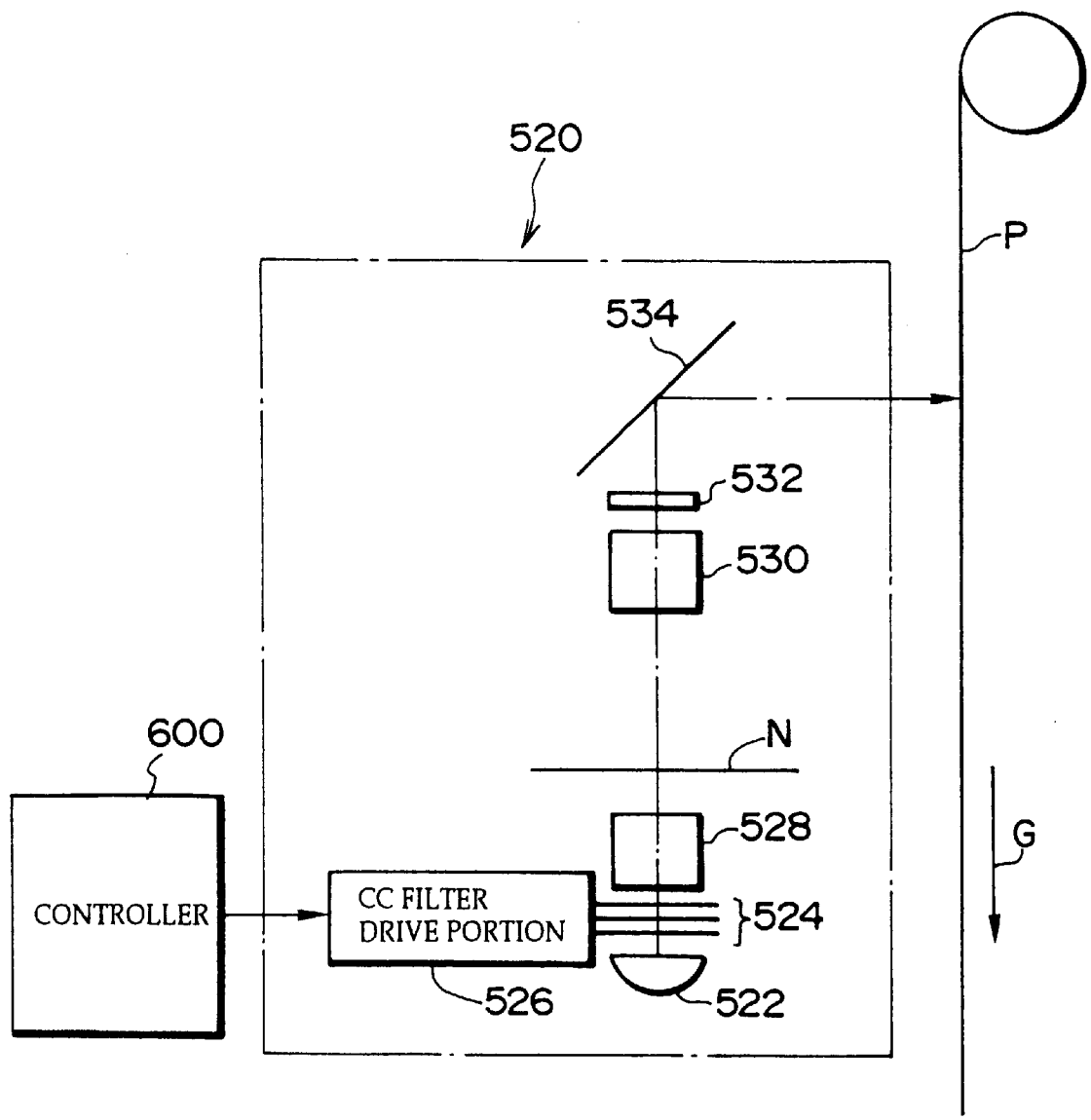
FIG. 15 is a schematic structural diagram of a film exposure section of the third embodiment of the present invention.

As shown in FIG. 15, the film exposure section 520 is provided with a light source 522 and light emitted from the light source 522 is sent to the negative film N set at a predetermined position via a color correction filter (hereinafter referred to as a CC filter) 524 and a diffusion barrel 528. The CC filter unit 524 is formed from three filters of C (cyan), M (magenta), and Y (yellow), each of which is provided such that an amount by which the filter is inserted into an optical path of the light emitted from the light source 522 can be varied by a CC filter drive portion 526 operating under the control of the above-described controller 600. An exposure lens 530, a black shutter 532, and a mirror 534 are arranged sequentially along the direction in which light transmitted through the negative film N advances. The exposure lens 530 is used to vary magnification of an image to be exposed, the black shutter 532 is used to cut off light for exposure during non-exposure processing, and the mirror 534 causes the light for exposure to be reflected substantially at right angles. The light for exposure reflected by the mirror 534 is irradiated on the color paper P conveyed in the direction indicated by arrow G in FIG. 14 along a predetermined path in the exposure section 512 shown in FIG. 14. As a result, the image recorded on the negative film N is exposed onto the color paper P. Note that, as the color paper P, an auto-positive color paper is used.

Figure 16:
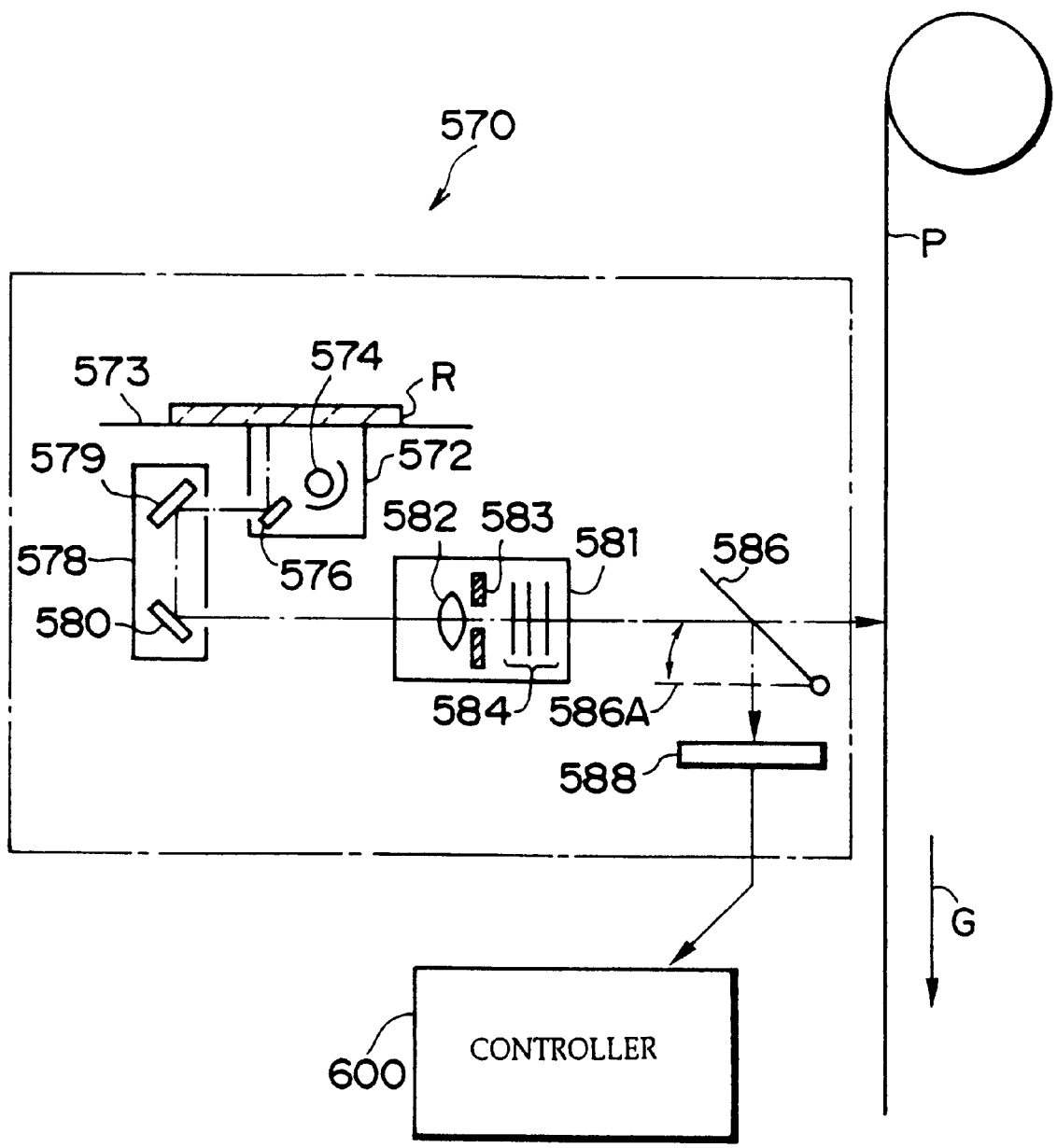
FIG. 16 is a schematic structural diagram of a copy-exposure section of the third embodiment of the present invention.

Referring now to FIG. 16, the copy exposure section 570 includes a lamp unit 572, a mirror unit 578, a filter unit 581, a CCD line sensor 588 serving as a photometric sensor, and a mirror 586 disposed so as to be inserted into an optical path of light from the filter unit 581.

The lamp unit 572 is formed from a bar-shaped halogen lamp 574 serving as a light source, and a first mirror 576. The mirror unit 578 is formed from a second mirror 579 and a third mirror 580. Further, the filter unit 581 includes three color adjustment filters 584 for three colors of cyan, magenta, and yellow, a lens 582, and a diaphragm mechanism 583.

Light from the halogen lamp 574 is reflected by a photographic print R mounted at a predetermined position and the reflected light is reflected sequentially by the first mirror 576, the second mirror 579, and the third mirror 580, and is thereafter made incident on the filter unit 581. The light made incident on the filter unit 581 is color-adjusted by the color adjustment filters 584 and is provided to form an image on the color paper P or on the CCD line sensor 588 by the lens 582. When the mirror 586 is inserted into the position indicated by the solid line in FIG. 16, the light from the filter unit 581 is reflected by the mirror 586 and an image is thereby formed on the CCD line sensor 588. On the other hand, when the mirror 586 is retracted to the position indicated by the broken line in FIG. 16, the light from the filter unit 581 is provided to form an image on the color paper P being conveyed along the predetermined path in the direction indicated by arrow G in the exposure section 512 shown in FIG. 14.

Further, the above-described lamp unit 572 and mirror unit 578 are provided to move along a mounting table 573 on which the photographic print R is mounted. As a result, when an image recorded on the photographic print R is scanned and the scanning light (i.e., reflected light from the photographic print R) is irradiated on the color paper P, the image recorded on the photographic print R is copy-exposed onto the color paper P. Further, the above-described scanning light (i.e., the reflected light from the photographic print R) is detected by the CCD line sensor 585, the density of the image recorded on the photographic print R can be measured.

Figure 17:
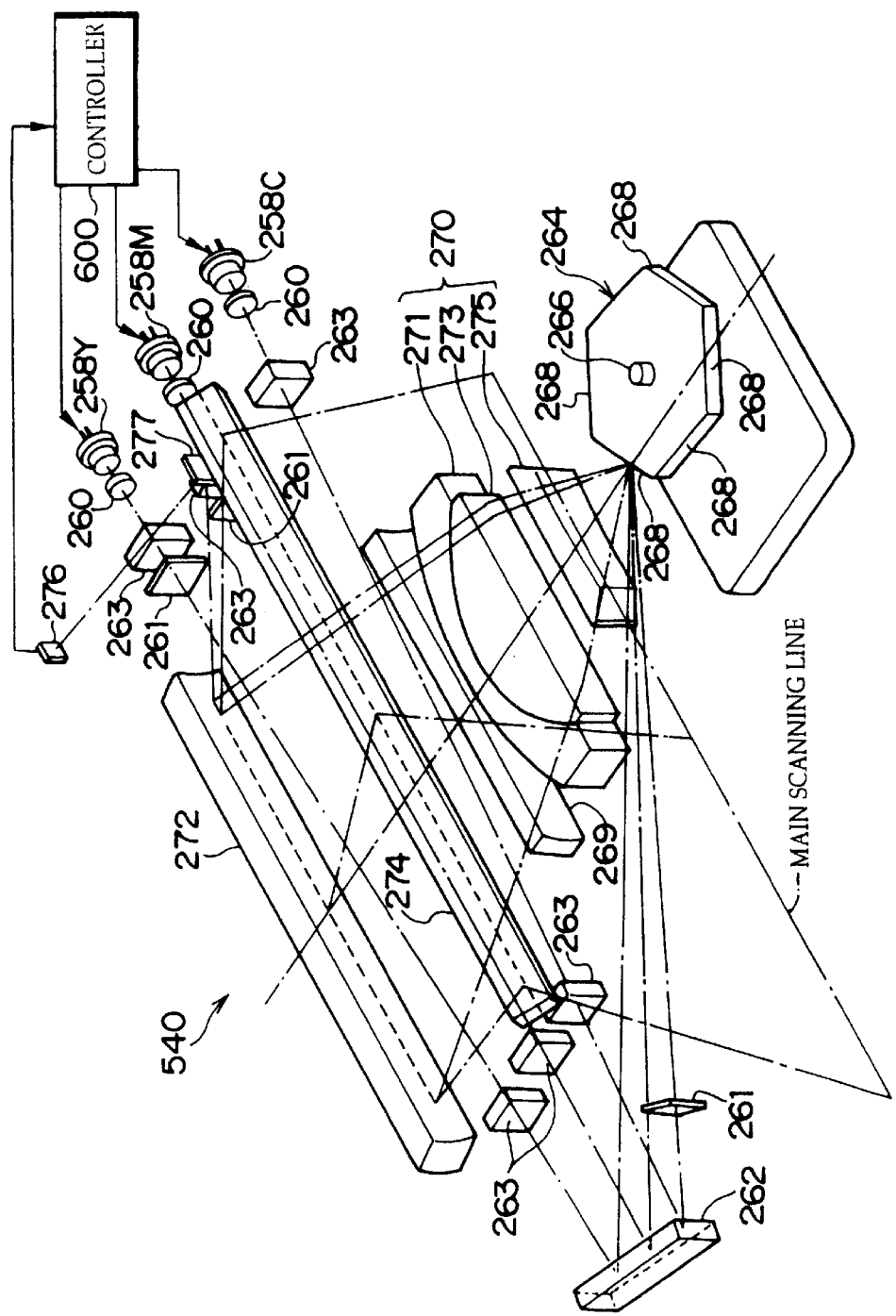
FIG. 17 is a schematic structural diagram of a digital exposure section of the third embodiment of the present invention.

As shown in FIG. 17, the digital exposure section 570 has the same structure as that of the exposure device 38 of the first embodiment shown in FIG. 3 and a detailed description thereof will be omitted.

The controller 600 reads out digital image data of an image to be exposed from an external storage device 602 shown in FIG. 14 and controls an electric current to be supplied for each of the semiconductor lasers 258C, 258M, and 258Y such that a light beam based on the digital image data is emitted at appropriate emission timing and light intensity. Meanwhile, as the image data to be exposed by the digital exposure section 540, image data prepared by an external information processing apparatus or the like and input to the controller 600 via a storage medium such as a floppy disk or image data transferred from an external information processing apparatus or the like through an input port (not shown) is provided in the controller 600 and via a network such as a local area network (LAN) and is input to the controller 600.

Further, the controller 600 is also connected to the conveying system of the color paper P in FIG. 14 by a signal line (not shown) and controls so that the conveying timing of the color paper P and the emission timing of the light beam from the above-described semiconductor lasers are synchronized with each other.

In the exposure section 512 of the printer processor 510 shown in FIG. 14, a light beam from any one of the above-described film exposure section 520, copy exposure section 570, and digital exposure section 540 is irradiated on the color paper P being conveyed along the predetermined conveying path by conveying rollers 96, 98, and the like, and an image is thereby exposed onto the color paper P. The exposed color paper P is conveyed to the development processing section 34.

The development processing section 34 shown in the second embodiment has the same structure as that of the development processing section 34 of the first embodiment shown in FIG. 1, and a detailed description thereof will be omitted.

Next, an operation of the third embodiment will be described. Here, calculation processing of a print image rate and an actual replenishment quantity for a development processing solution and replenishment control processing based on the actual replenishment quantity, which are to be effected by the controller 600, will be described with reference to FIGS. 18 through 21.

Figure 18:
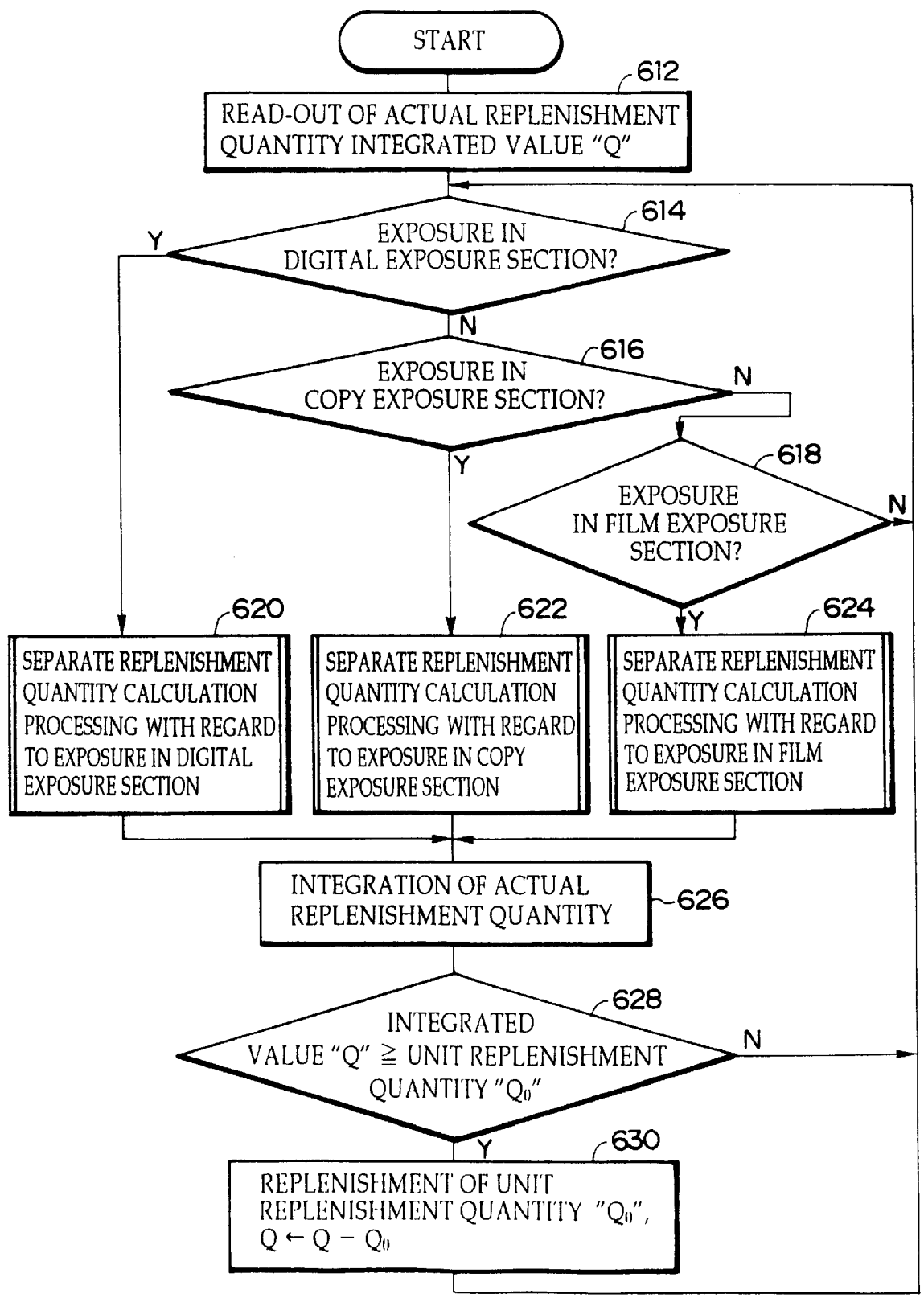
FIG. 18 is a flowchart showing a control routine of a developing agent replenishing operation in the third embodiment of the present invention.

In step 612 shown in FIG. 18, actual replenishment quantity integrated value Q which is an integrated value with regard to an actual replenishment quantity of the development processing solution is backed up, as a previous replenishment integrated value, in a battery backup memory or the like. The subsequent step 614 makes a determination as to whether exposure is effected by the digital exposure section 540, step 616 makes a determination as to whether exposure is effected by the copy exposure section 570, and step 618 makes a determination as to whether exposure is effected by the film exposure section 520.

On the basis of respective decision results of steps 614, 616, and 618, when exposure is effected by the digital exposure section 540, the process proceeds to step 620, and when exposure is effected by the copy exposure section 570, the process proceeds to step 622, and further, when exposure is effected by the film exposure section 520, the process proceeds to step 624. Further, when exposure is not effected in any of these exposure sections, the process returns to step 614.

When exposure is effected by the digital exposure section 540, the process proceeds to step 620 and a subroutine shown in FIG. 19 of separate replenishment quantity calculation processing with regard to exposure in the digital exposure section is executed. First, in step 642 shown in FIG. 19, digital image source data is taken in. In the next step 644, predetermined image processing is applied to the digital image source data so that output digital image data is prepared. Further, in step 646, based on the output digital image data, the print image rate is, for example, calculated as described below.

To effect calculation processing for the print image rate in step 646, as illustrated with regard to the above-described fifth aspect and also as illustrated in the above-described second embodiment, for example, a method in which data is extracted from the output digital image data based on a predetermined extraction rule can be employed.

Further, the extracted data is also processed as shown with regard to the above-described fifth aspect and also as illustrated in the above-described second embodiment.

After calculation of print image rate D in step 646 as described above, the process proceeds to step 648, in which a separate replenishment quantity of the developing agent is calculated by the expression (2) described above.

Meanwhile, step 648 may be effected in such a manner that, based on the print image rate table which shows correspondence between the print image rate previously set at values of several grades and a separate replenishment quantity per unit processing area, a separate replenishment quantity per unit processing area corresponding to the calculated print image rate is obtained and a separate replenishment quantity may be calculated from the separate replenishment quantity per unit processing area and an actual processing area.

Figure 20:
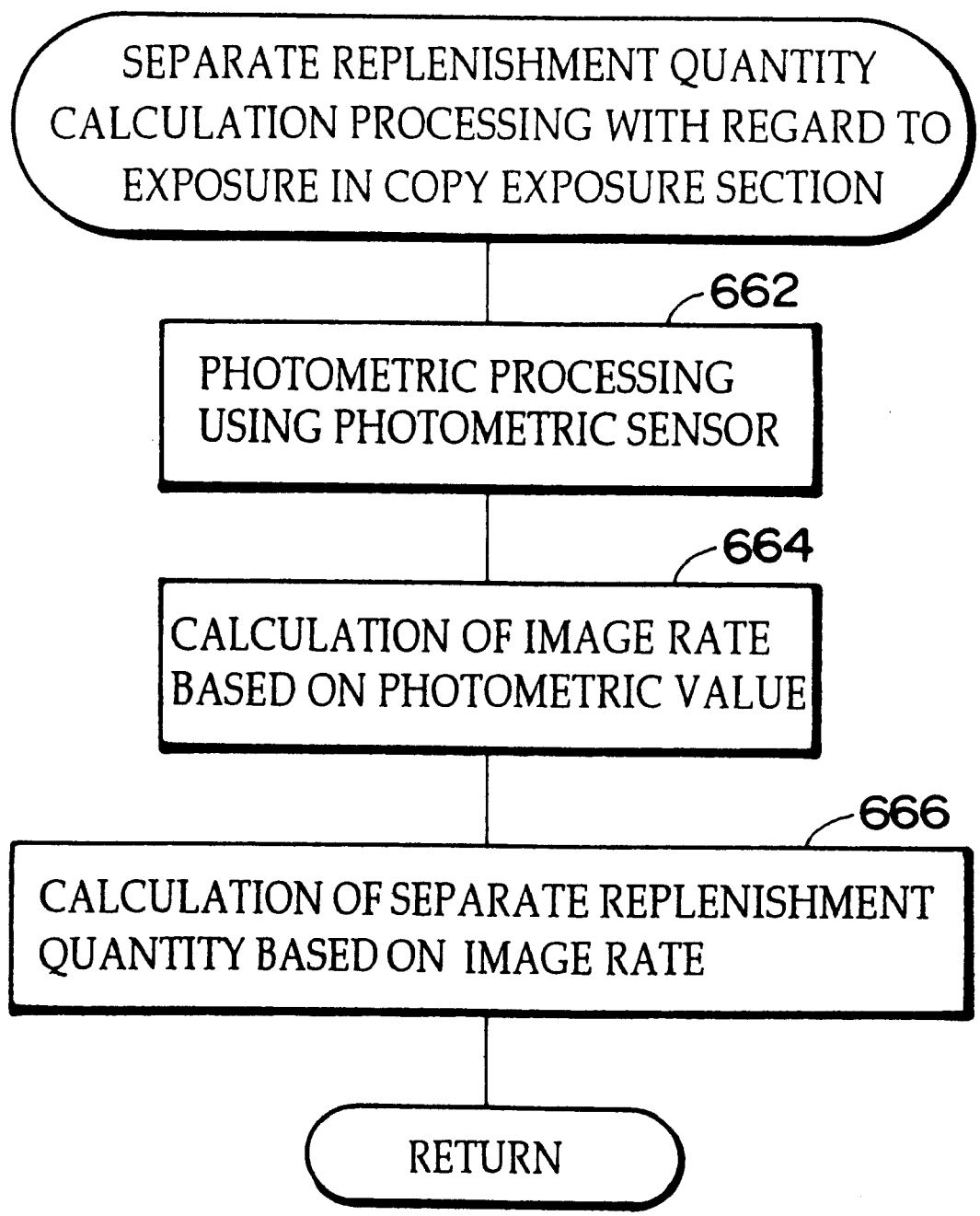
FIG. 20 is a flowchart showing a subroutine of a separate replenishment quantity calculation operation for exposure processing in the copy-exposure section in the third embodiment of the present invention.

On the basis of the respective decision results of steps 614, 616, and 618 in FIG. 18, when exposure is effected by the copy exposure section 570, the process proceeds to step 622 and a subroutine shown in FIG. 20 of separate replenishment quantity calculation processing with regard to exposure in the copy exposure section is executed. First, in step 662 shown in FIG. 20, the mirror 586 is inserted into the position indicated by the solid line in FIG. 16 and the light source 574 is turned on. Subsequently, the lamp unit 572 and the mirror unit 578 are moved along the mounting table 573 on which the photographic print R with an image to be exposed being recorded thereon is mounted. As a result, the image recorded on the photographic print R is scanned and the scanning light (i.e., reflected light from the photographic print R) is deflected by the mirror 586 to form an image on the CCD line sensor 588. Then, the scanning light (the reflected light from the photographic print R) is photometrically measured by the CCD line sensor 588. Based on the photometric value, the average density of the image recorded on the photographic print R can be measured.

In the subsequent step 664, in the same manner as in step 646 shown in FIG. 19, the respective average densities of the three colors of R, G, and G of the image recorded on the photographic print R are obtained based on the above measured photometric value, and three-color average density DA of the respective average densities of the three colors being averaged is obtained. Further, print image rate D is calculated from three-color average density $D_A$. In the subsequent step 666, in the same way as in step 648 shown in FIG. 19, a separate replenishment quantity of the developing agent is calculated by the above-described expression (2).

Finally, based on the respective decision results of steps 614, 616, and 618 in FIG. 19, when exposure is effected by the film exposure section 520, the process proceeds to step 624 and a subroutine shown in FIG. 21 of separate replenishment quantity calculation processing with regard to exposure in the film exposure section 520 is executed. First, in step 684 in FIG. 21, on the basis of a value designated by an operation panel or the like, a processing area of the color paper P exposed by the film exposure section 520 is calculated. In the subsequent step 686, on the assumption that the image rate of an image exposed by the film exposure section 520 is substantially fixed, by multiplying the above calculated processing area of the color paper P with a previously set constant, a separate replenishment quantity corresponding to the processing area is calculated.

After execution of any one of the respective processing of steps 620, 622, and 624 shown in FIG. 18, the process proceeds to step 626, in which a quantity of development processing solution to be supplied for the color development processing tank 34A (i.e., an actual replenishment quantity) is integrated by integrating the above calculated separate replenishment quantity. In the subsequent step 628, a determination is made as to whether or not actual replenishment quantity integrated value Q has become at least a previously set unit replenishment quantity $Q_0$ of the development processing solution to be supplied for the color development processing tank 34A. When the actual replenishment quantity integrated value Q is less than the unit replenishment quantity $Q_0$, the process returns to step 614.

On the other hand, when the determination in step 628 is made that actual replenishment quantity integrated value Q is greater than or equal to unit replenishment quantity $Q_0$, the process proceeds to step 630, in which the pump 50 shown in FIG. 4, described above in the first embodiment, is driven for a predetermined time so that the development processing solution of unit replenishment quantity $Q_0$ is supplied for the color development processing tank 34A. Further, in step 630, the unit replenishment quantity $Q_0$ is subtracted from the actual replenishment quantity integrated value Q and the result of this subtraction becomes a new actual replenishment quantity integrated value Q. Subsequently, the process returns to step 614 and a determination is made again in each of steps 614, 616, and 618. On the basis of the respective decision results of steps 614, 616, and 618, the separate replenishment quantity calculation processing of the development processing solution, which corresponds to the exposure processing being executed in accordance with the above decision, and the integration processing of the actual replenishment quantity are effected repeatedly.

In accordance with the calculation processing of print image rate and separate replenishment quantity of the development processing solution, and actual replenishment quantity calculation and replenishment control processing based on the separate replenishment quantity, shown in the above-described embodiments, when the color paper P onto which images are exposed in a plurality of exposure sections (i.e., the film exposure section 520, the copy exposure section 570, and the digital exposure section 540) is subjected to development processing, on the assumption that images exposed in these exposure section have different print image rates, the print image rate and the separate replenishment quantity are calculated by an appropriate method for each of the exposure sections, the actual replenishment quantity for the color development processing tank 34A is integrated, and proper replenishment control based on the actual replenishment quantity is thereby effected. For this reason, the development processing solution within the color development processing tank 34A can be constantly maintained in a stabilized state.

Particularly, even when exposure is effected for image data whose image rate is generally not uniform (for example, digital image data), a proper separate replenishment quantity can be calculated on the basis of the image data and an appropriate actual replenishment quantity of the developing agent can be calculated accordingly. As a result, the state of the developing agent can be stabilized still further due to the replenishing processing based on the proper actual replenishment quantity.

Further, it is not necessary for an operator to visually recognize a finished state of a prepared photographic print for each fixed period and to manually supply a proper quantity of the developing agent based on experience.

Moreover, since precise replenishing processing is realized by the above-described embodiments, the quantity of developing agent can be reduced, and therefore, the development processing tank can be made smaller and the actual replenishment quantity of the developing agent can be reduced, which is now preferable.

In addition, respective separate replenishment quantities of developing agent, which correspond to respective image exposure processing in the plurality of exposure sections, are integrated, an overall actual replenishment quantity of developing agent for a common development processing tank is obtained from their sums, and on the basis of the overall actual replenishment quantity, replenishment is effected by a common replenishing mechanism. For this reason, the structure for effecting replenishment control and replenishing processing can be replaced by the plurality of exposure sections and the manufacturing cost of the printer processor 510 can be set at a low cost.

Meanwhile, in the above-described embodiments, the determination is made that the timing of replenishment being effected has come due to the fact that actual replenishment quantity integrated value Q has become previously set unit replenishment quantity $Q_0$ or greater. However, the determination may also be made that the timing of replenishment has come due to the fact that that a predetermined time or more has elapsed after the previous replenishment in an interval time. Alternatively, the timing of replenishment may be controlled such that, every time a separate replenishment quantity is calculated in any of steps 620, 622, and 624 shown in FIG. 18, the development processing solution of the calculated separate replenishment quantity is supplied.

In the foregoing, calculation processing of the actual replenishment quantity of the color developing solution to be supplied for the color development processing tank 34A and replenishment control processing were described as an example. However, even when a bleach-fix processing solution is supplied for the bleach-fix processing tank 34B or a rinse processing solution is supplied for the rinse processing tank 34C, the above-described calculation processing of actual replenishment quantity and replenishment control processing can also be effected.

Figure 22:
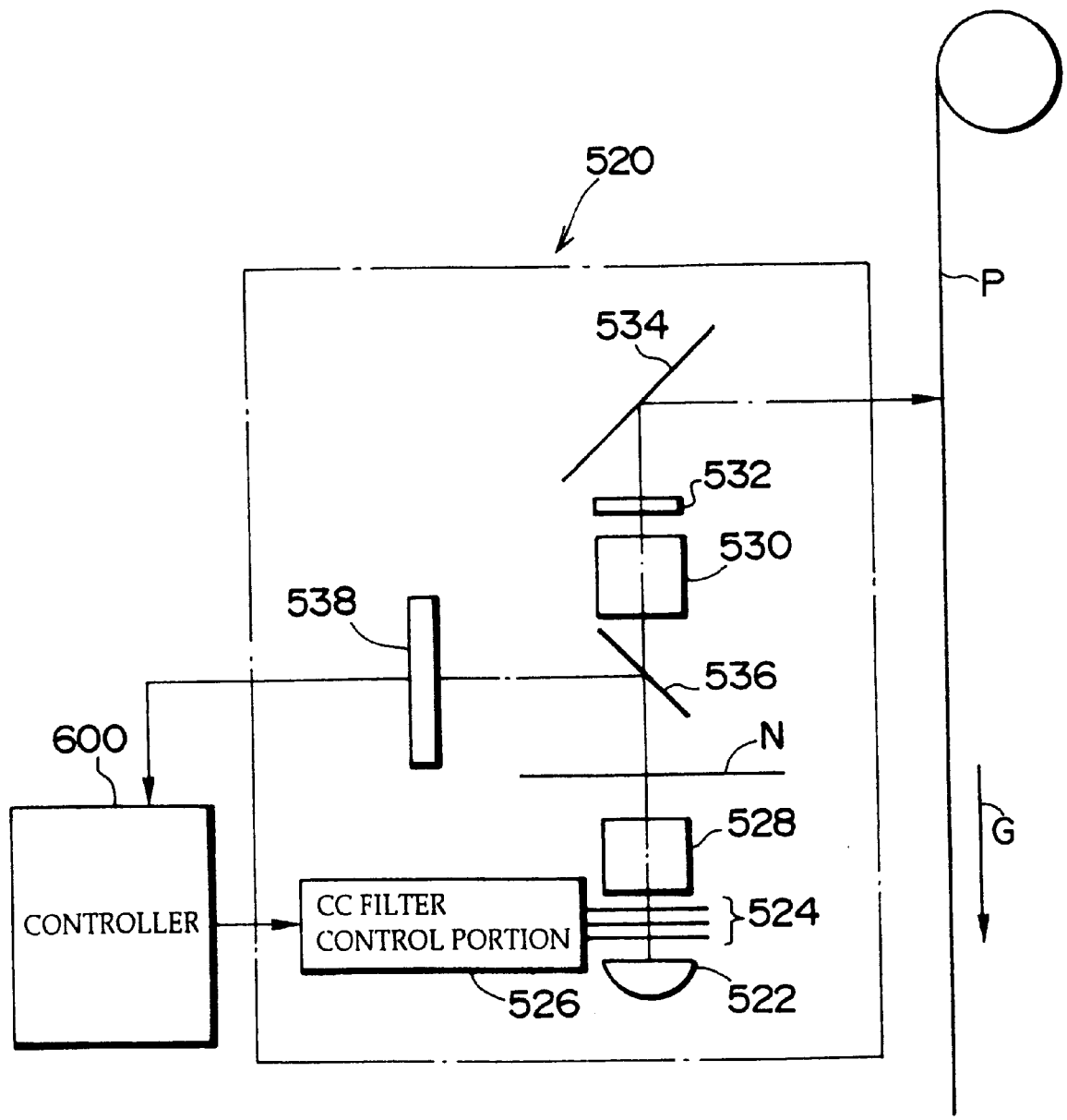
FIG. 22 is a diagram showing another structural example of the film exposure section in the third embodiment of the present invention.

Further, as shown in FIG. 22, the film exposure section 520 may be constructed such that a half mirror 536 is disposed on an optical path of light from the light source 522, a CCD image sensor 538 is disposed in a direction in which light is reflected by the half mirror 536, and an image signal of an image formed on the CCD image sensor 538 is input to the controller 600. With the film exposure section 520 having the above-described structure, calculation processing may be made in such a manner that an average density of an image on the negative film N is measured by the controller 600 on the basis of the image signal, an appropriate image rate is calculated on the basis of the average density value in the same manner as the separate replenishment quantity calculation processing with regard to the copy exposure section of FIG. 20, and on the basis of the calculated image rate, the separate replenishment quantity having higher precision is calculated.

Further, in the separate replenishment quantity calculation processing with regard to exposure in the digital exposure section 540 (see FIG. 19) and in the separate replenishment quantity calculation processing with regard to exposure in the copy exposure section 570 (see FIG. 20), the print image rate is calculated on the basis of output digital image data or a photometric value, and on the basis of the image rate, a separate replenishment quantity is calculated. However, after an appropriate print image rate is previously set by a previous experiment or the like, a separate replenishment quantity may be calculated, by using the set print image rate, in accordance with a quantity for development processing.

Further, in the above-described embodiments, when the color development processing solution is supplied for the color development processing tank 34A, the example was described in which the color development processing solution having a developing agent being dissolved in water or preservatives is supplied. However, so long as water or preservatives, and the developing agent are controlled to be separately supplied, more precise replenishment control of the developing agent can be realized, which is more preferable.

What is claimed is:

1. A developing agent replenishing method in a digital photographic printer in which an image is exposed onto a photosensitive material based on digital data containing image data and the exposed photosensitive material is developed by a developing agent, comprising the steps of:
   (a) calculating an image rate of an image to be exposed based on the digital data, the image rate being a parameter for obtaining, based on at least one of density characteristic of the image to be exposed, depth of the image to be exposed, and contrast of the image to be exposed, a replenishment quantity of a developing agent used for development processing of the image to be exposed;
   (b) calculating a replenishment quantity of the developing agent based on the calculated image rate; and
   (c) effecting replenishment of the developing agent based on the calculated replenishment quantity.

2. A developing agent replenishing method according to claim 1, wherein the digital data is digital image source data containing attribute data of the image data, and in said step (a), the image rate is calculated on the basis of the attribute data.

3. A developing agent replenishing method according to claim 1, wherein the digital data is one of digital image source data and output digital image data obtained due to predetermined image processing being effected for the digital image source data and used for exposure of the photosensitive material, and in said step (a), the image rate is calculated on the basis of said one of the digital image source data and the output digital image data.

4. A developing agent replenishing method according to claim 3, wherein in said step (a) data is extracted from said one of the digital image source data and the output digital image data in accordance with a predetermined extraction method, and based on the extracted data, the image rate is calculated.

5. A digital photographic printer in which an image is exposed onto a photosensitive material based on digital data containing image data and the exposed photosensitive material is developed by a developing agent, comprising:
   density characteristic calculation means which calculates, based on the digital data, a density characteristic value of an image to be exposed;
   image rate calculation means which calculates, on the basis of the density characteristic value calculated by said density characteristic calculation means, a print image rate corresponding to the density characteristic value as a parameter for obtaining a replenishment quantity of the developing agent based on the density characteristic value of the image;
   replenishment quantity calculation means which calculates the replenishment quantity of the developing agent based on the print image rate calculated by said image rate calculation means; and
   replenishing means which effects replenishing processing of the developing agent based on the replenishment quantity calculated by said replenishment quantity calculation means.

6. A digital photographic printer according to claim 5, wherein the digital data is digital image source data containing attribute data of the image data and said density characteristic calculation means is provided to calculate the density characteristic value of the image on the basis of the attribute data.

7. A digital photographic printer according to claim 5, wherein the digital data is one of digital image source data and output digital image data obtained due to predetermined image processing being effected for the digital image source data and used for exposure of the photosensitive material, and said density characteristic calculation means is provided to calculate, based on said one of the digital image source data and the output digital image data, the density characteristic value of the image.

8. A processing chemicals replenishing method in which processing chemicals are supplied into a common processing tank in a photographic printer including a plurality of exposure sections in which an image is exposed onto a photosensitive material by light irradiated from a light source, and also including a processing section in which the photosensitive material exposed by any one of the plurality of exposure sections is processed by processing chemicals in the common processing tank, said method comprising the steps of:
   (a) calculating a separate replenishment quantity of processing chemicals for the processing section according to each of the plurality of exposure sections in which the photosensitive material is exposed, the separate replenishment quantity being provided to correspond to each of the exposure sections in which the photosensitive material is exposed; and
   (b) calculating, based on the calculated separate replenishment quantity, an actual replenishment quantity of processing chemicals to be supplied to the processing tank.

9. A processing chemicals replenishing method according to claim 8, further comprising the step of:
   (c) prior to said step (a), detecting whether the exposure of photosensitive material is effected in any one of the plurality of exposure sections.

10. A processing chemicals replenishing method according to claim 8, wherein said step (b) is provided to calculate the actual replenishment quantity by summing up calculated separate replenishment quantities.

11. A photographic printer including a plurality of exposure sections in which an image is exposed onto a photosensitive material by light irradiated from a light source, and a development processing section in which the photosensitive material exposed by any one of the plurality of exposure sections is developed by a developing agent in a common development processing tank, comprising:
   identification means which identifies an exposure section, in which the photosensitive material is exposed, among the plurality of exposure sections;
   separate replenishment quantity calculation means which calculates a replenishment quantity of the developing agent corresponding to the identified exposure section for each identified exposure section; and
   actual replenishment quantity calculation means which calculates, based on the calculated replenishment quantity, an actual replenishment quantity of the developing agent to be supplied into the development processing tank.

12. A photographic printer according to claim 11, wherein the plurality of exposure sections comprises a digital exposure section in which output digital image data is generated due to predetermined image processing being effected for digital image source data, which contains image data representing an image to be exposed and attribute data representing an attribute of the image data, and based on the generated output digital image data, the image is exposed onto the photosensitive material, and also comprises an analog exposure section in which light from the light source is irradiated on any one of an original on which the image is recorded and a photographic film on which the image is recorded and one of reflected light and transmitted light of the irradiated light is projected on the photosensitive material so as to allow the image to be exposed onto the photosensitive material.

13. A photographic printer according to claim 12, wherein the analog exposure section includes at least one of a reflection exposure section in which light from the light source is irradiated on the original and the reflected light is projected on the photosensitive material so as to allow the image of the original to be exposed onto the photosensitive material, and a transmission exposure section in which light from the light source is irradiated on the photographic film and the transmitted light is projected on the photosensitive material to allow the image to be exposed onto the photosensitive material.

14. A photographic printer according to claim 13, wherein said separate replenishment quantity calculation means is provided to selectively execute any one of first calculation processing, second calculation processing, and third calculation processing, wherein the first calculation processing is provided to calculate an image rate of an image to be exposed based on at least one of the image data, the attribute data, and the output digital image data which are contained in the digital image source data, the image rate being a parameter for obtaining, based on at least one of density characteristic of the image to be exposed, depth of the image to be exposed, and contrast of the image to be exposed, a replenishment quantity of the developing agent used for development processing of the image to be exposed, and said first calculation processing is provided to calculate, based on the image rate, a separate replenishment quantity of the developing agent corresponding to the digital exposure section;

the second calculation processing is provided to calculate, based on a photometric quantity from one of the original and the photographic film, an image rate of an image, to be exposed, of said one of the original and the photographic film, and based on the calculated image rate, the second calculation processing is provided to calculate a separate replenishment quantity of the developing agent corresponding to the analog exposure section; and the third calculation processing is provided to calculate, based on a previously set image rate, a separate replenishment quantity of the developing agent corresponding to the analog exposure section.

15. A photographic printer according to claim 14, wherein said separate replenishment quantity calculation means is provided to selectively execute any one of first calculation processing, second calculation processing, and third calculation processing, wherein the first calculation processing is provided to calculate an image rate of an image to be exposed based on at least one of the image data, the attribute data, and the output digital image data which are contained in the digital image source data, the image rate being a parameter for obtaining, based on at least one of density characteristic of the image to be exposed, depth of the image to be exposed, and contrast of the image to be exposed, a replenishment quantity of the developing agent used for development processing of the image to be exposed, and said first calculation processing is provided to calculate, based on the image rate, a separate replenishment quantity of the developing agent corresponding to the digital exposure section;

the second calculation processing is provided to calculate, based on a photometric quantity from one of the original and the photographic film, an image rate of an image, to be exposed, of said one of the original and the photographic film, and based on the calculated image rate, the second calculation processing is provided to calculate a separate replenishment quantity of the developing agent corresponding to the analog exposure section; and the third calculation processing is provided to calculate, on the basis of a previously set image rate, a separate replenishment quantity of the developing agent corresponding to the analog exposure section.

16. A photographic printer according to claim 11, further comprising:

replenishing means which is common to the plurality of exposure sections and effects replenishment of the developing agent for the development processing tank based on the actual replenishment quantity calculated by said actual replenishment quantity calculation means.

17. A photographic printer according to claim 12, further comprising:

replenishing means which is common to the plurality of exposure sections and effects replenishment of the developing agent for the development processing tank based on the actual replenishment quantity calculated by said actual replenishment quantity calculation means.

18. A photographic printer according to claim 13, further comprising:

replenishing means which is common to the plurality of exposure sections and effects replenishment of the developing agent for the development processing tank based on the actual replenishment quantity calculated by said actual replenishment quantity calculation means.

19. A photographic printer according to claim 14, further comprising:

replenishing means which is common to the plurality of exposure sections and effects replenishment of the developing agent for the development processing tank on the basis of the actual replenishment quantity calculated by said actual replenishment quantity calculation means.

20. A photographic printer according to claim 15, further comprising:

replenishing means which is common to the plurality of exposure sections and effects replenishment of the developing agent for the development processing tank based on the actual replenishment quantity calculated by said actual replenishment quantity calculation means.

* * * * *